(12) United States Patent
Takamoto et al.

(10) Patent No.: US 7,127,635 B2
(45) Date of Patent: Oct. 24, 2006

(54) METHOD FOR CORRECTING A PROGRAM RUNNING ON A COMPUTER SYSTEM

(75) Inventors: Yoshifumi Takamoto, Kokubunji (JP); Nobutoshi Sagawa, Koganei (JP); Toshiyuki Ukai, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 882 days.

(21) Appl. No.: 10/046,203

(22) Filed: Jan. 16, 2002

(65) Prior Publication Data

US 2002/0162049 A1  Oct. 31, 2002

(30) Foreign Application Priority Data

Apr. 27, 2001  (JP) .............................. 2001-130919

(51) Int. Cl.
*G06F 11/00* (2006.01)
(52) U.S. Cl. ....................................................... 714/6
(58) Field of Classification Search .................. 714/6, 714/5, 7, 12, 13, 15, 20
See application file for complete search history.

(56) References Cited

U.S. PATENT DOCUMENTS

| | | | |
|---|---|---|---|
| 5,437,033 A | | 7/1995 | Inoue et al. |
| 5,621,885 A | * | 4/1997 | Del Vigna, Jr. ................ 714/13 |
| 5,829,001 A | * | 10/1998 | Li et al. ........................ 707/10 |
| 5,852,724 A | * | 12/1998 | Glenn et al. ................. 709/239 |
| 5,951,695 A | * | 9/1999 | Kolovson ..................... 714/16 |
| 6,185,695 B1 | * | 2/2001 | Murphy et al. ................ 714/4 |
| 6,275,953 B1 | * | 8/2001 | Vahalia et al. ................ 714/11 |
| 6,701,455 B1 | * | 3/2004 | Yamamoto et al. ........... 714/18 |
| 6,898,727 B1 | * | 5/2005 | Wang et al. ................... 714/4 |
| 6,948,089 B1 | * | 9/2005 | Fujibayashi ................... 714/6 |

* cited by examiner

*Primary Examiner*—Robert Beausoliel
*Assistant Examiner*—Amine Riad
(74) *Attorney, Agent, or Firm*—Mattingly, Stanger, Malur & Brundidge, P.C.

(57) ABSTRACT

Disclosed herein is a method for correcting programs without discontinuing service that is running on a logical computer. A patch manager 109 copies programs and data under control of a logical computer 1 (105) from one disk to another disk and activates a logical computer 2 (106). The logical computer 2 (106) corrects the copied programs by using a correction program in the copied programs. Then, the patch manager 109 switches control of a network from the logical computer 1 (105) to the logical computer 2 (106) in order to switch operation from the logical computer 1 (105) to the logical computer 2 (106).

11 Claims, 24 Drawing Sheets

FIG. 5

306: LOGICAL COMPUTER RESOURCE MANAGE TABLE

| LOGICAL COMPUTER ID | PROCESSOR/ ASSIGN RATE | MEMORY | DISK DEVICE | NETWORK DEVICE |
|---|---|---|---|---|
| LOGICAL COMPUTER #1 | CPU1/100% | 128MB | DISK 1<br>DISK 2 | NET 1 |
| LOGICAL COMPUTER #2 | CPU2/100% | 128MB | DISK 3<br>DISK 4 | NET 2 |
| LOGICAL COMPUTER #3 | CPU3/50% | 64MB | DISK 5 | |
| LOGICAL COMPUTER #4 | CPU3/50% | 64MB | DISK 6 | NET 3 |

FIG. 6

307 : PATCH TABLE

| PATCH FILE | SECURITY | EXPANSION OF CAPABILITY | CORRECTION OF FUNCTION | CORRECTION | EXECUTE NEXT TIME | RESULT OF CORRECTION |
|---|---|---|---|---|---|---|
| PATCH #1 | ○ | | | 1998/12/25 | | |
| PATCH #2 | | ○ | | NOT YET | × | |
| PATCH #3 | | | ○ | NOT YET | × | |
| PATCH #4 | ○ | | | 1999/3/26 | | |
| PATCH #5 | ○ | | | 1999/8/15 | | |
| PATCH #6 | | | ○ | 1999/9/15 | | |
| PATCH #7 | ○ | | | NOT YET | ○ | |

METHOD FOR CORRECTING A PROGRAM RUNNING ON A COMPUTER SYSTEM

BACKGROUND OF THE INVENTION

The present invention relates to a method for correcting programs running on a computer, and, more particularly, relates to a method for correcting programs without discontinuing service provided by the programs.

By virtue of widespread use of the Internet, every computer became accessible substantially from all over the world. But, at the same time, it is expected that possibility of unauthorized access to computers may increase. As a protective measure against such situation, there are publicly released various patch files that prevent such unauthorized access to the computers. In the patch file, program correction information for correcting programs is recorded, and the unauthorized access may be prevented by using the patch file to correct the programs. The patch file may be applied to all programs running on the computer. For example, the programs running on the computer may include an operating system, applications and so on. A program correction procedure using the patch file is as follows: (1) discontinuing service; (2) applying the patch file and correcting the programs; (3) restarting the system; and (4) restarting the service. In order to correct the programs in such procedure, it is necessary to discontinue the service temporarily. It is because the operating system and the applications typically may not be corrected while they are running. Therefore, when the computer is operating, the correction procedure may be applied to the programs which are not active temporarily, and at the time of the next starting, the corrected programs may be used.

In the conventional program correction procedure, it is necessary to discontinue service temporarily to correct the program. Since new patch files for program correction are created frequently, if the service is discontinued every time the new patch file is created, quality of the service may be decreased. In one method, such frequent discontinuance may be mitigated by executing the program correction procedure for several patch files collectively. But considering the fact that unauthorized access to the computer may be made at any time from anyone unexpectedly, it is not preferred to postpone the program correction concerning security. One technology for correcting programs is described in Japanese Patent Application Laid-Open No. Hei 8-263279. In this document, a method is described for performing program correction without terminating programs running on logical computers in a computer system that has a mechanism for virtualizing computers and building a plurality of logical computers from one physical computer. But, in this method, the program correction may be performed not to the programs that are running on the logical computers, but to the control programs that control the plurality of logical computers centrally. Further, while the control programs are corrected, almost all programs on the logical computers are terminated. That is, the programs on the logical computers cannot continue service because they stop working. Still further, this method does not provide correction for the programs such as an operating system and applications that process the service on the logical computers.

SUMMARY OF THE INVENTION

It is an object of the invention to provide a method for correcting programs without discontinuing service running on logical computers.

It is another object of the invention to provide a method for quickly detecting occurrence of correction programs newly registered externally and correcting the programs by using the correction programs without delay.

A method for correcting programs in a typical embodiment according to the present invention of a computer system having a plurality of logical computers is characterized by the steps of: copying programs and data under control of a first logical computer that is in operation from one storage means to another storage means; activating a second logical computer that has been in standby mode by using the copied program; correcting the copied programs by using a correction program included in the copied programs; switching control of a network from the first logical computer to the second logical computer; and switching operation from the first logical computer to the second computer that uses the corrected programs.

Another feature according to the present invention is characterized by the steps of: when switching the network, changing the assigned computer of a first network address from the first logical computer to the second logical computer while changing the network address of the first logical computer to a new second network address; then, when transmitting a packet from a network device of the computer system, changing the source address included in the packet from the second network address to the first network address. Through such process, the packet which remains unprocessed for responding to a request in the first logical computer can be sent to the correct requesting party.

Other features of the present invention are made clear in the Detailed Description of the Invention. New matters disclosed in the present invention are as follows:

(1) A method for correcting programs that comprises the steps of: monitoring if new correction programs are registered externally; when the new correction programs are registered, downloading the registered correction programs and recording the downloaded programs in storage means; notifying an external administrator terminal of registration of the correction programs; and according to instructions from the administrator terminal, correcting the programs to be corrected by executing the correction programs.

(2) A program that allows a computer to implement the features of: monitoring if new correction programs are registered externally; when the new correction programs are registered, downloading the registered correction programs to record the downloaded programs in storage means; notifying an external administrator terminal of registration of the correction programs; and according to instructions from the administrator terminal, correcting programs to be corrected by executing the correction programs.

BRIEF DESCRIPTION OF THE DRAWINGS

FIG. 5 is a diagram showing a configuration of a logical computer resource management table in the embodiment;

FIG. 6 is a diagram showing a configuration of a patch table in the embodiment;

DETAILED DESCRIPTION OF THE INVENTION

[Embodiment 1]

Figure 1:
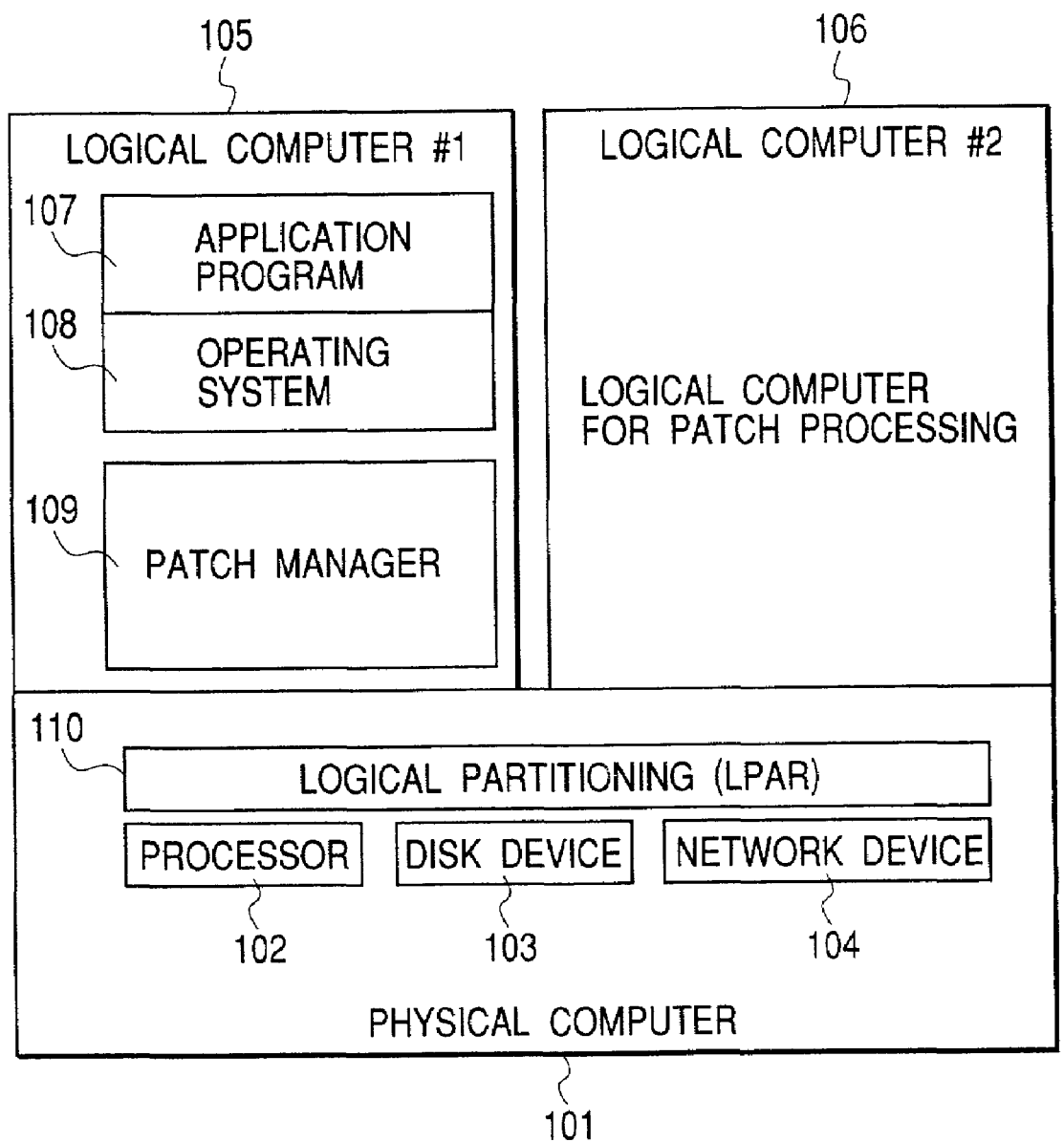
FIG. 1 is a general block diagram of a first embodiment of the present invention.

Hereinafter, a first embodiment of a method for correcting programs in logical computer environment according to the present invention is described with reference to the drawings:

FIG. 1 shows a general block diagram of the method for correcting programs in logical computer environment in the first embodiment. There are shown a physical computer 101 and a processor 102, a disk device 103 and a network device 104 in the physical computer 101. There is also shown a logical partitioning mechanism 110 that constructs a plurality of logical computers from the physical computer 101. Further, there are shown logical computers 105, 106 that are generated by the logical partitioning mechanism. An application program 107, an operating system 108 and a patch manager 109 are programs that operate in the logical computer 105. The operating system 108 may also be called as a guest OS that is running on the logical computer 105 to support hardware control of the logical computer 105 and operation of the application 107. The patch manager 109 is a program that constitutes a characteristic feature of the present invention and that performs program correction without discontinuing service provided by the application running on the logical computer 105. The logical computer 106 is a standby logical computer for a patch (a logical computer in standby mode) and indicates that no program is running on it. It is to be noted that more than one logical computer 105 may exist.

Figure 2:
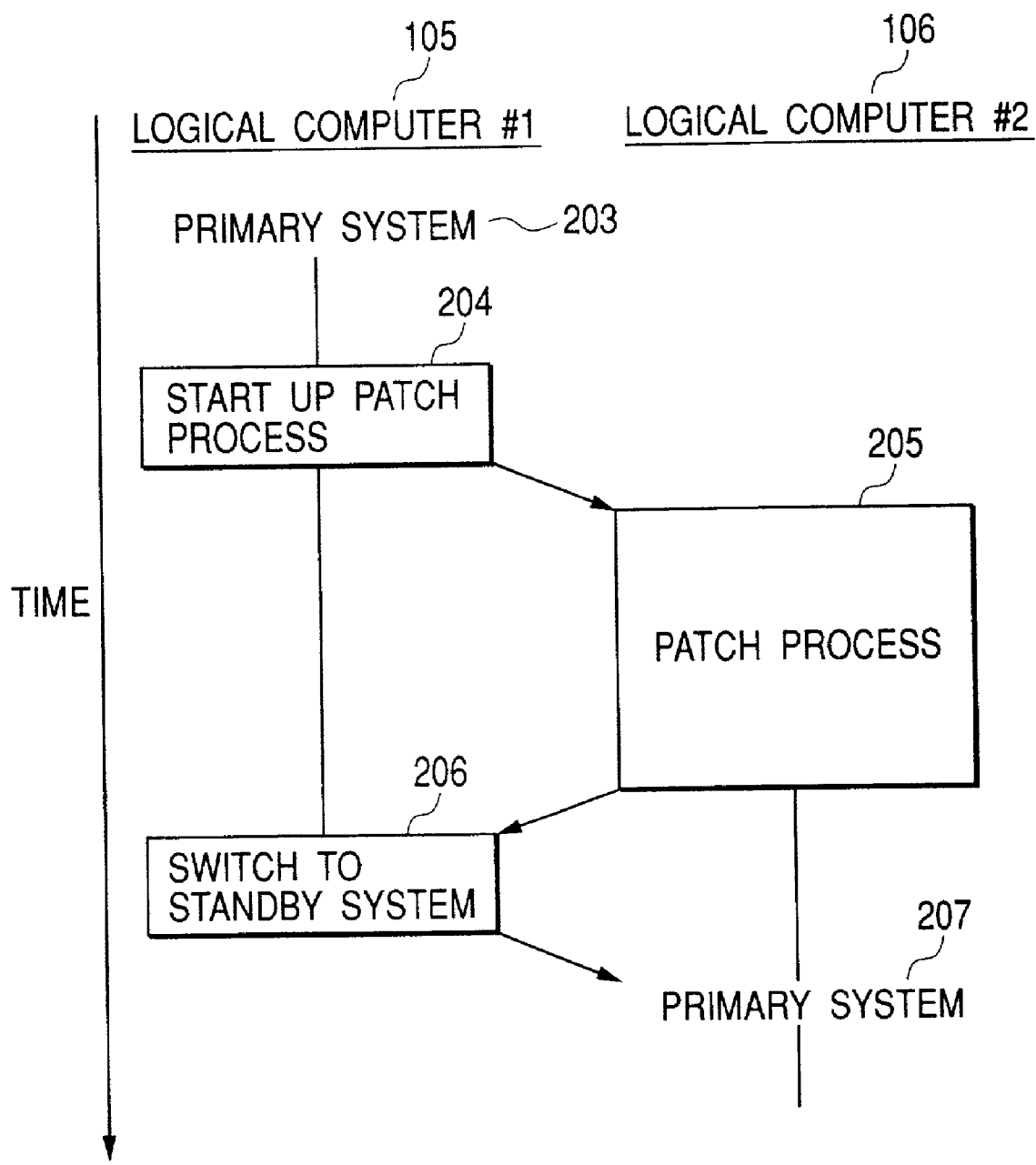
FIG. 2 is a diagram showing a patch process flow in the embodiment.

FIG. 2 shows a flow of program correction by the patch manager 109. There are shown the logical computers 105, 106. In this figure, a process flow is shown in which program correction is performed by using the logical computer 2 (106) without discontinuing service when the service is running on the logical computer 1 (105) (Step 203). In Step 204, the patch manager 109 activates patch process. During this activation process, the programs and data in the logical computer 1 (105) is copied into the logical computer 2 (106). Then, the patch process is executed on the logical computer 2 (106) and the software programs on the logical computer 2 (106) are corrected (Step 205). After the software programs on the logical computer 2 (106) have been corrected, control is switched to the logical computer 1 (105) so that the logical computer 1 (105) performs system switching process (Step 206). Through the system switching process (Step 206), the service exits from control by the logical computer 1 (105) and begin running on the logical computer 2 (106) (Step 207). Such process allows the service to run on the logical computer having the corrected programs, thereby providing more reliable service, and at the same time, eliminating the need for discontinuing the service by using two logical computers temporarily.

Figure 3:
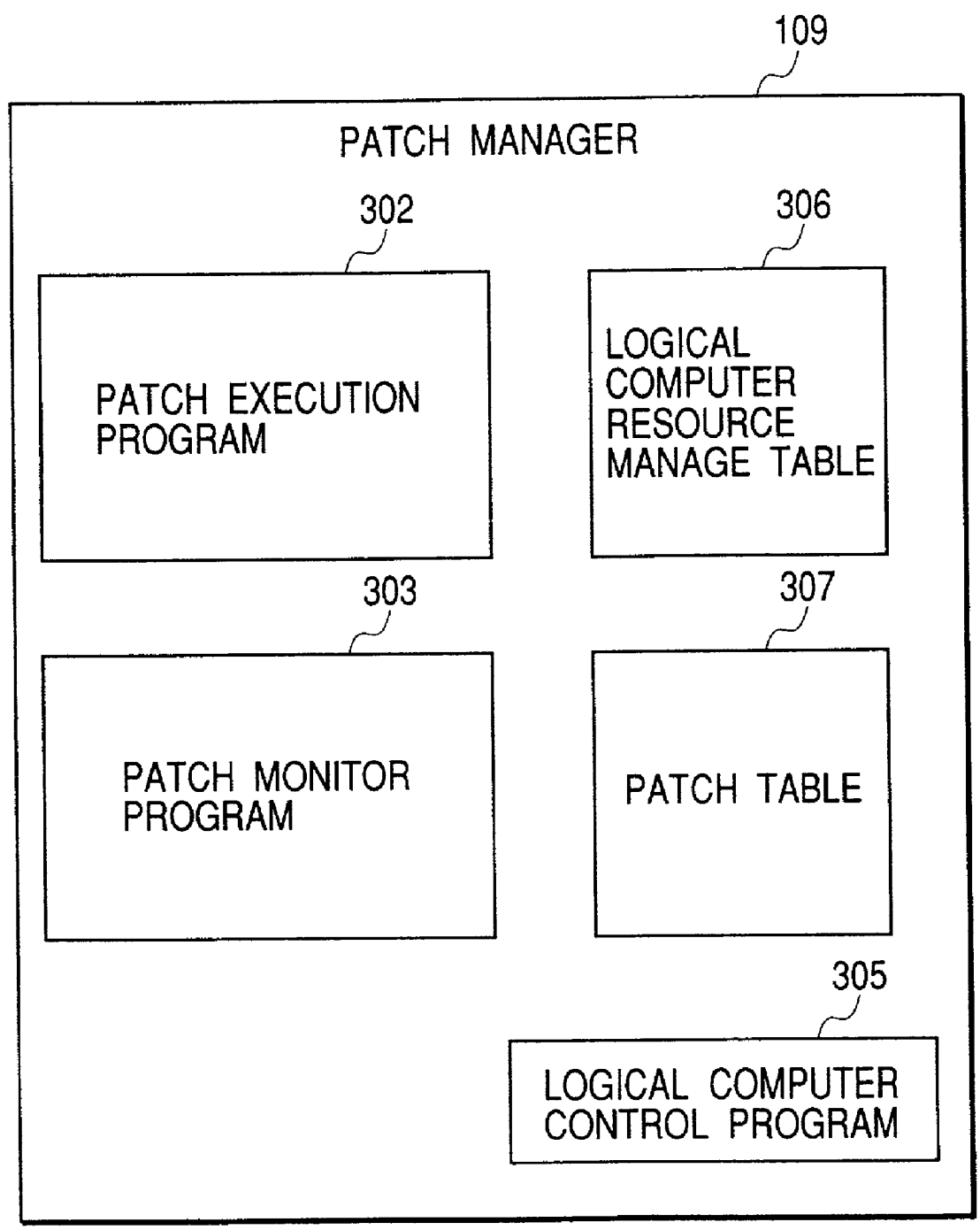
FIG. 3 is a diagram showing a configuration of a patch manager in the embodiment.

FIG. 3 shows a configuration of the patch manager 109. The patch manager 109 consists of a patch execution program 302, a patch monitor program 303, a logical computer resource management table 306, a patch table 307, and a logical computer control program 305. The patch execution program 302 is a program for activating the patch process on the standby logical computer. The patch monitor program 303 is a program for periodically monitoring a server on the Internet and the like (not shown) which stores patch files to see whether new patch files are registered, and prompting an administrator to execute the patch process. Resources owned by each logical computer such as processors, disk devices, network devices and the like are registered in the logical computer resource management table 306. The patch table 307 is a table for managing the patch files, where information such as distinction between already processed patch files and still not processed ones is registered. The logical computer resource management table 306 and the patch table 307 are referred/updated upon execution of the patch execution program 302 and the patch monitor program 303. The logical computer control program 305 is used when the patch execution program 302 and the patch monitor program 303 control other logical computers. The logical computer control program 305 provides an interface for communication between logical computers, activation of the logical computers and so on.

Figure 4:
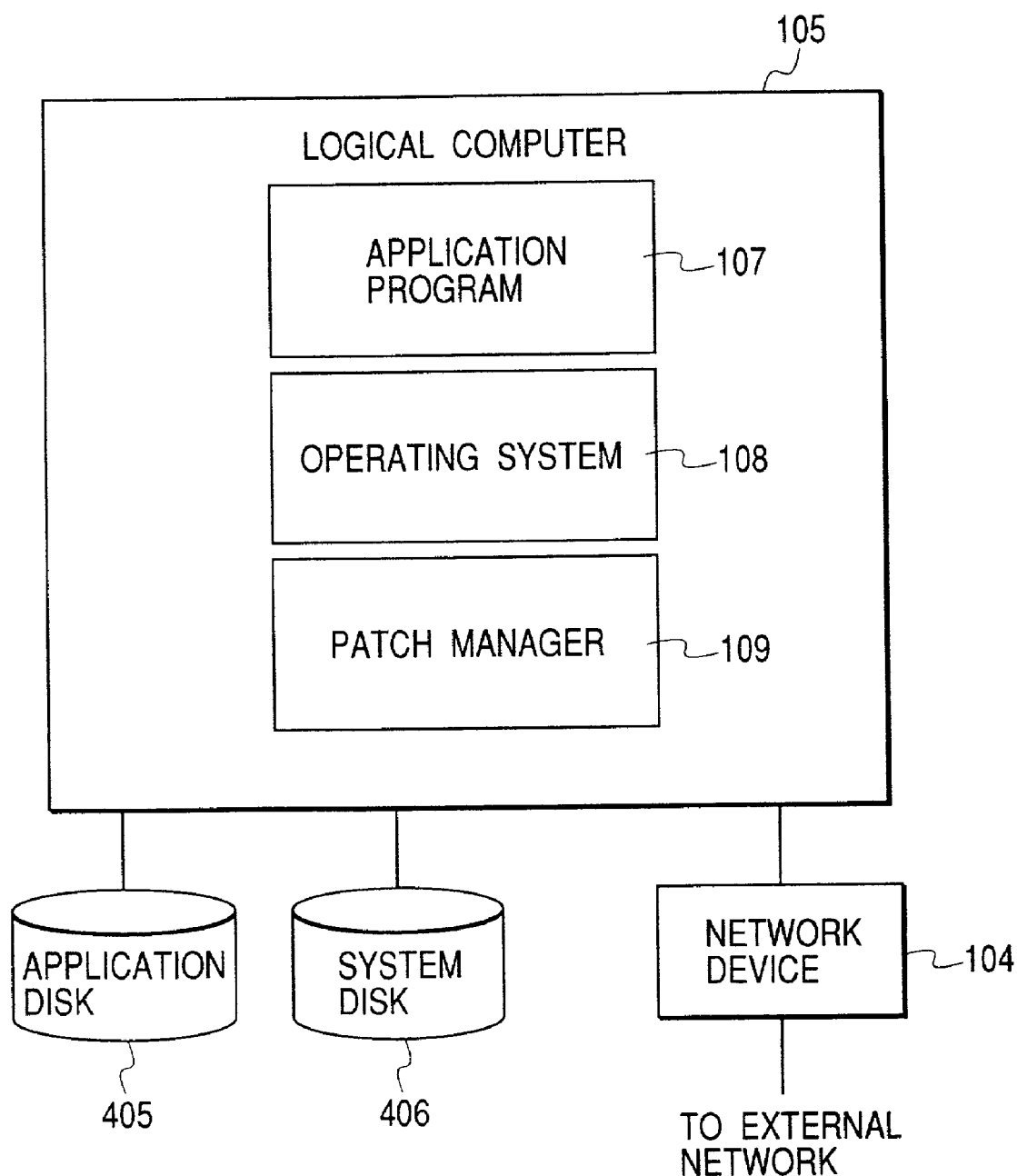
FIG. 4 is a diagram showing an exemplary configuration of a logical computer.

FIG. 4 shows a general configuration of the logical computer that is in operation. The logical computer 105 includes the application program 107 for providing the service, the operating system 108 and the patch manager 109. On the other hand, an application disk 405 that stores data used by the application program 107, a system disk 406 that is used by the operating system 108, and the network device 104 for network communication with the outside are connected to the logical computer. In this embodiment, a method for correcting programs without discontinuing service is described in an example of the configuration of the logical computer shown in FIG. 4.

FIG. 5 shows a configuration of the logical computer resource management table 306. The logical computer resource management table 306 stores resource allocation information such as a processor, disk devices, a network device, memory capacity and the like that are owned by each logical computer. A column 501 shows identifier of the logical computer, a column 502 shows a processor assignment rate, a column 503 shows allocated memory capacity, a column 504 shows the allocated disk devices, and a column 505 shows the allocated network device. For example, it is shown that the logical computer 1 is allocated 100% of the physical processor 1 and the DISK 1 and DISK 2 for peripherals as well as the network device NET1. In this example, the logical computer 1 or the logical computer 2 is allocated the resource that covers other resource allocated to other logical computers and therefore these logical computers may serve other logical computers as standby logical computers.

FIG. 6 shows a configuration of the patch table 307. In the patch table 307, information about already processed patch files and still not processed patch files and so on is stored. A column 601 shows names of the patch files, and columns 602–604 show types of the patch files. That is, the column 602 shows security related information, the column 603 shows capability expansion related information, and the column 604 shows function correction related information. A column 605 shows a date of correction. A column 606 specifies whether the patch files should be applied in next patch process. A column 607 stores execution result of the last executed patch process.

Figure 7:
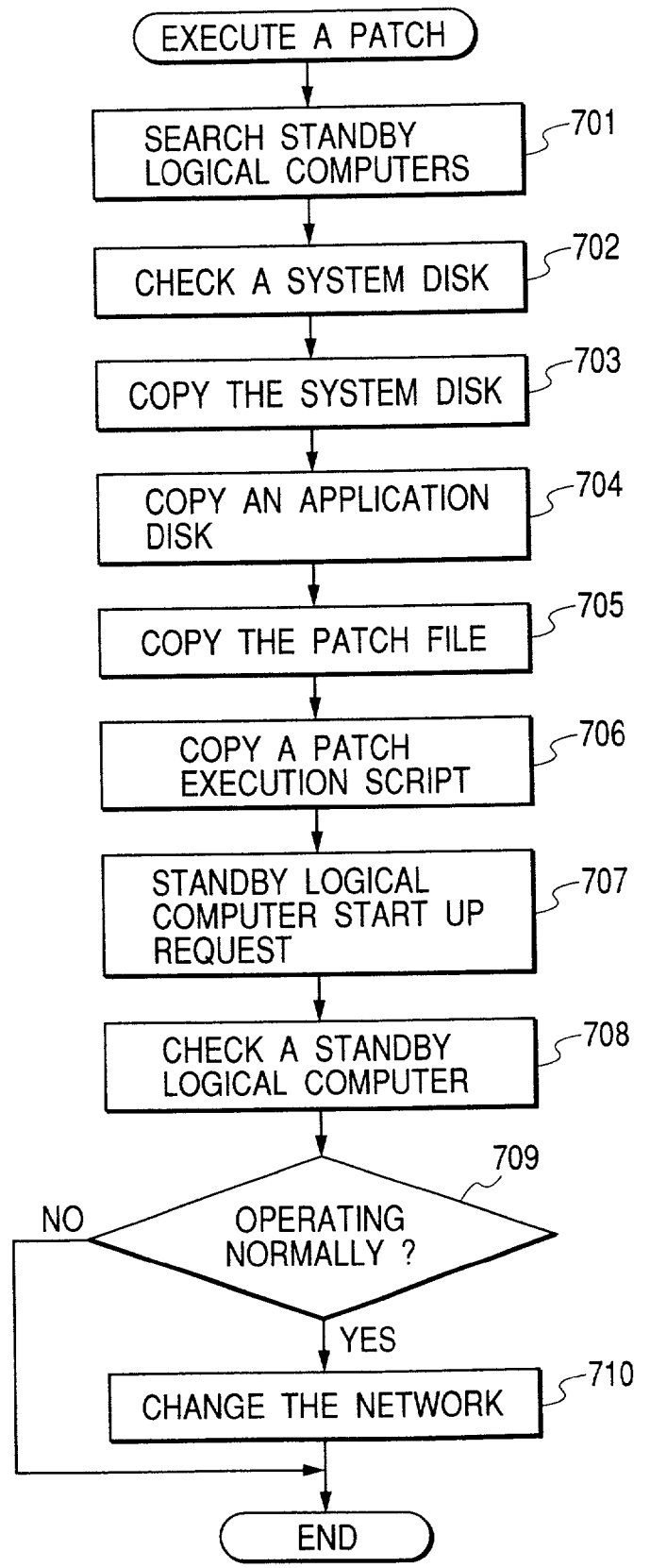
FIG. 7 is a flowchart of a patch execution program in the embodiment.

FIG. 7 shows a flowchart of the patch execution program 302. In Step 701, a search for the standby logical computer is performed. That is, in this Step, an unassigned logical computer having resources similar to ones of the logical computer subject to the patch process is located. For such purpose, the logical computer resource management table 306 is referenced so that, for example, when the programs on the logical computer 1 should be patch processed, the logical computer 2 that covers resources allocated to the logical computer 1 is assigned. In Step 702, the system disk is checked. Here, the system disk refers to a storage unit that stores the operating system used by the logical computer executing its service at present. Mainly, in this Step, it is checked whether the system includes any improper program such as a virus. This is a preprocessing before copying the system disk in Step 703 for the purpose of preventing the system that otherwise may have the improper programs from being transferred. In Step 703, the system disk is copied. For example, when DISK1 of the logical computer 1 shown in the logical computer resource management table 306 is assigned as the system disk, its contents are copied to DISK3 of the logical computer 2. In Step 704, the application disk is copied. The application disk refers to a storage unit that stores application programs and application data. In this disk, data used by the application running on the logical computer that provides service at present is stored. For example, contents of DISK2 of the logical computer 1 shown in the logical computer resource management table 306 are copied to DISK4 of the logical computer 2. In Step 705, the patch files are copied to the system disk of the standby logical computer. At this time, the patch table 307 is also copied in a similar manner. Here, the patch files 601 listed in the patch table 307 of FIG. 6 are copied. When the standby logical computer is activated, the patch process is executed by using the patch files. In Step 706, a patch execution script is copied to the system disk of the standby logical computer. As will be described in detail later, the patch execution script is an automated script that allows the patch process to be executed automatically when the standby logical computer is activated.

In Step 707, the standby logical computer is requested to activate. The request is issued to the logical computer control program 305, which, in turn, requests the logical partitioning mechanism 110 to start up the specified logical computer. As a result of such request, the standby logical computer starts up the operating system 108 by using the system disk that has been copied in Step 702. When the standby logical computer is activated, the patch execution script that has been copied in Step 706 is started up automatically to execute the predefined patch process. In Step 708, a request to restart the standby logical computer is issued. The request is issued to the logical computer control program 305, which, in turn, requests the logical partitioning mechanism 110 to restart the specified logical computer. This restart is performed in order to make the patch process effective. When the patch process has been finished, the correction by the patch process is still not effective, which will become effective after restarting the system. Therefore, in Step 708, the request is issued to restart the system of the standby logical computer. In Step 709, it is checked whether the patch process on the standby logical computer has been finished normally. As a result, if the patch process on the standby logical computer has been finished normally, network switching process is performed in Step 710 so that the logical computer to provide the service is changed. If the patch process on the standby logical computer has not been finished normally, the current logical computer continues to provide the service. There may be cases where it cannot be determined immediately whether the patch process has been finished normally. For example, problems may occur in some hours' operation after completion of the patch process. In such case, it is possible to correct or otherwise address the occurring problems while the service continues by switching the service to the previous logical computer again according to the embodiment of the present invention.

Figure 8:
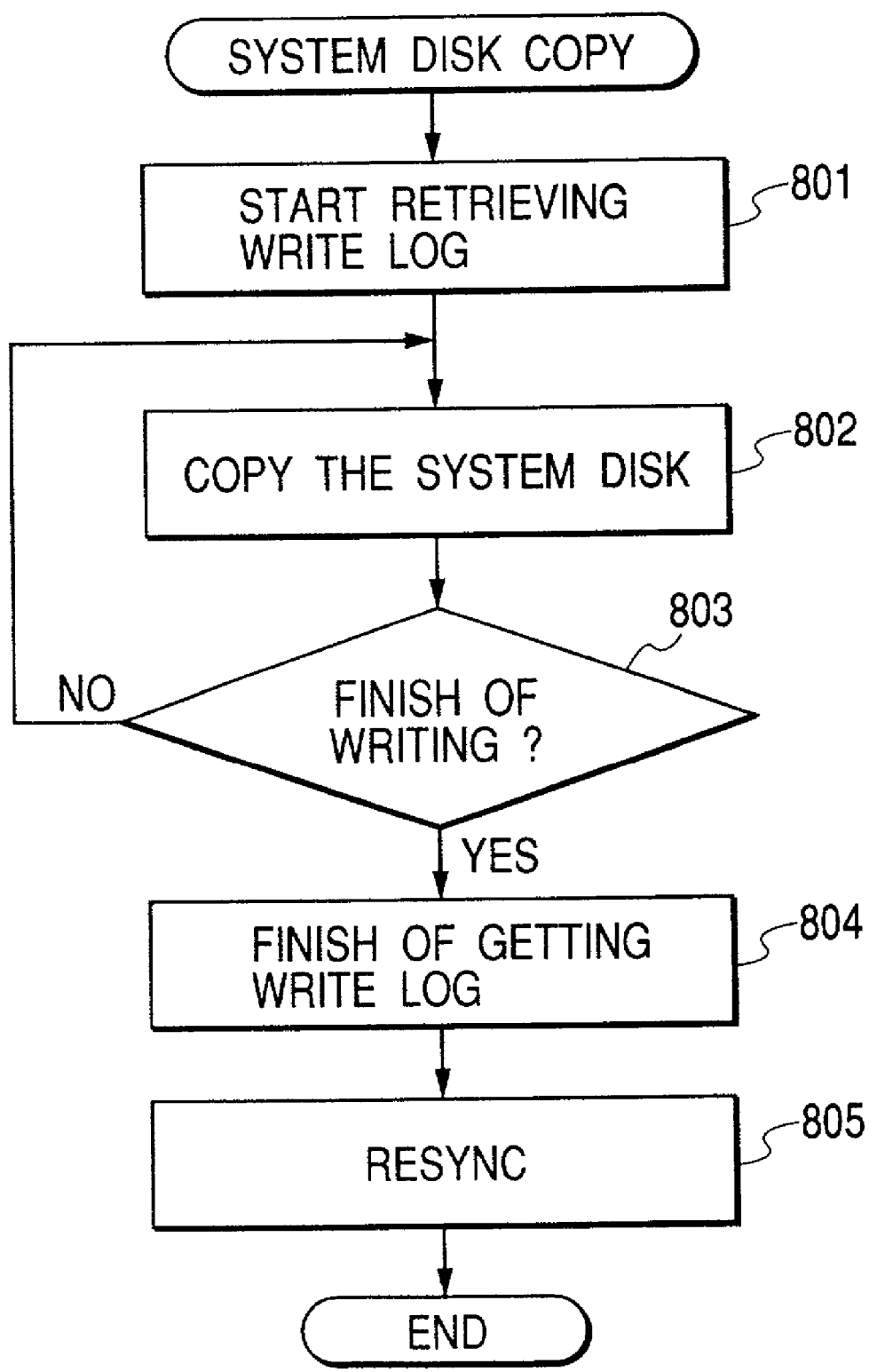
FIG. 8 is a flowchart showing a procedure for copying a system disk in the embodiment.

FIG. 8 shows a detailed process flow for copying the system disk in Step 703 of the FIG. 7. In Step 801, collection of a write log is started. The write log is collected for recording information that is updated during the copying process. In Step 802, the copying operation of the system disk is performed. In Step 803, it is checked whether the copying operation has been finished. In Step 804, the collection of the write log is ended. In Step 805, the information that has been updated during the copying operation is reflected on the system disk that is a target of the copying operation. It allows the copied system disk to be kept in the latest state.

Figure 9:
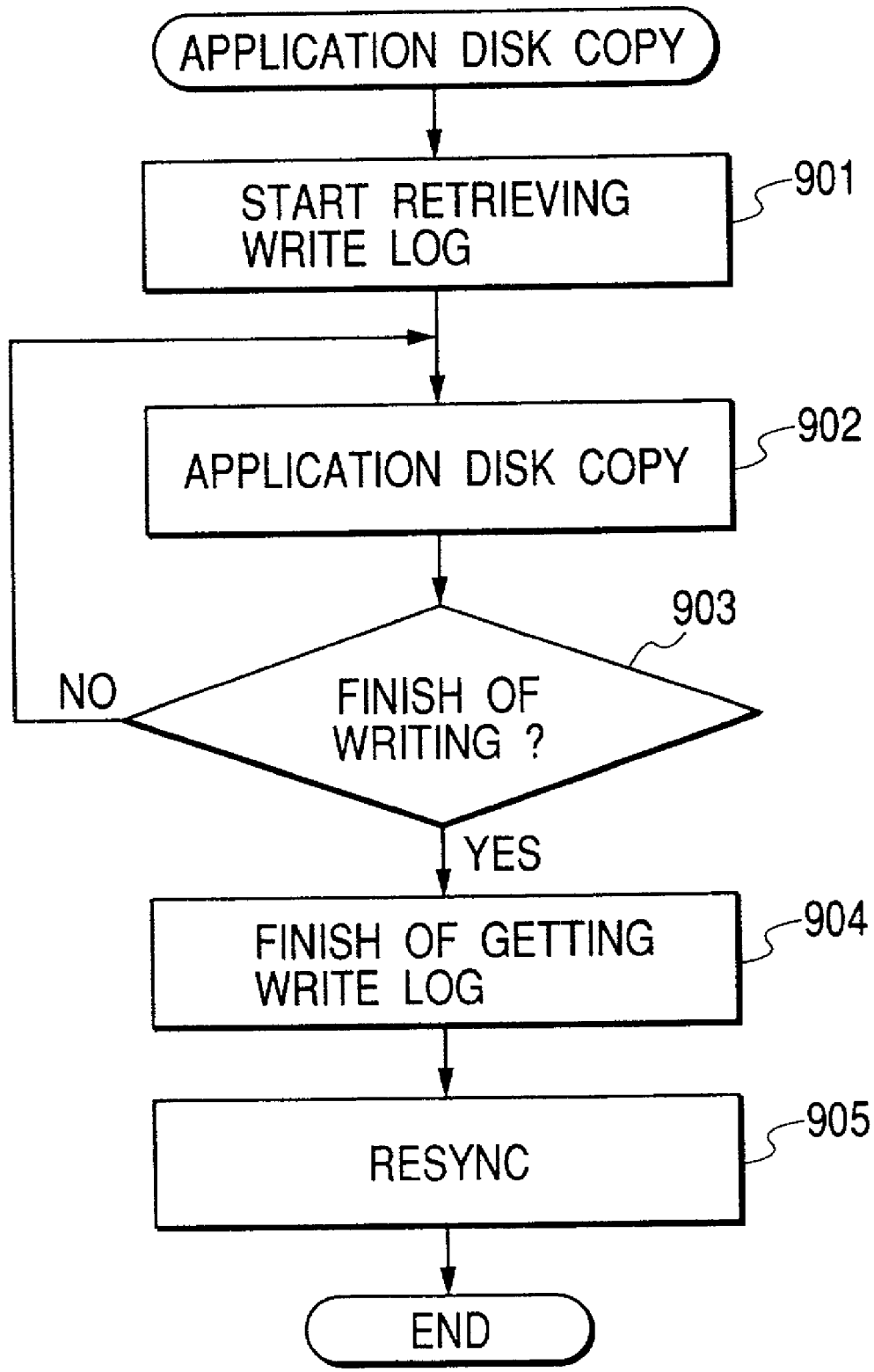
FIG. 9 is a flowchart showing a procedure for copying an application disk in the embodiment.

FIG. 9 shows a detailed process flow for copying the application disk in Step 704 of the FIG. 7. In Step 901, collection of a write log is started. The write log is collected for recording information that is updated during the copying process. In Step 902, the copying operation of the application disk is performed. In Step 903, it is checked whether the copying operation has been finished. In Step 904, the collection of the write log is ended. In Step 905, the information that has been updated during the copying operation is reflected on the application disk that is a target of the copying operation. It allows the copied application disk to be kept in the latest state.

Figure 10:
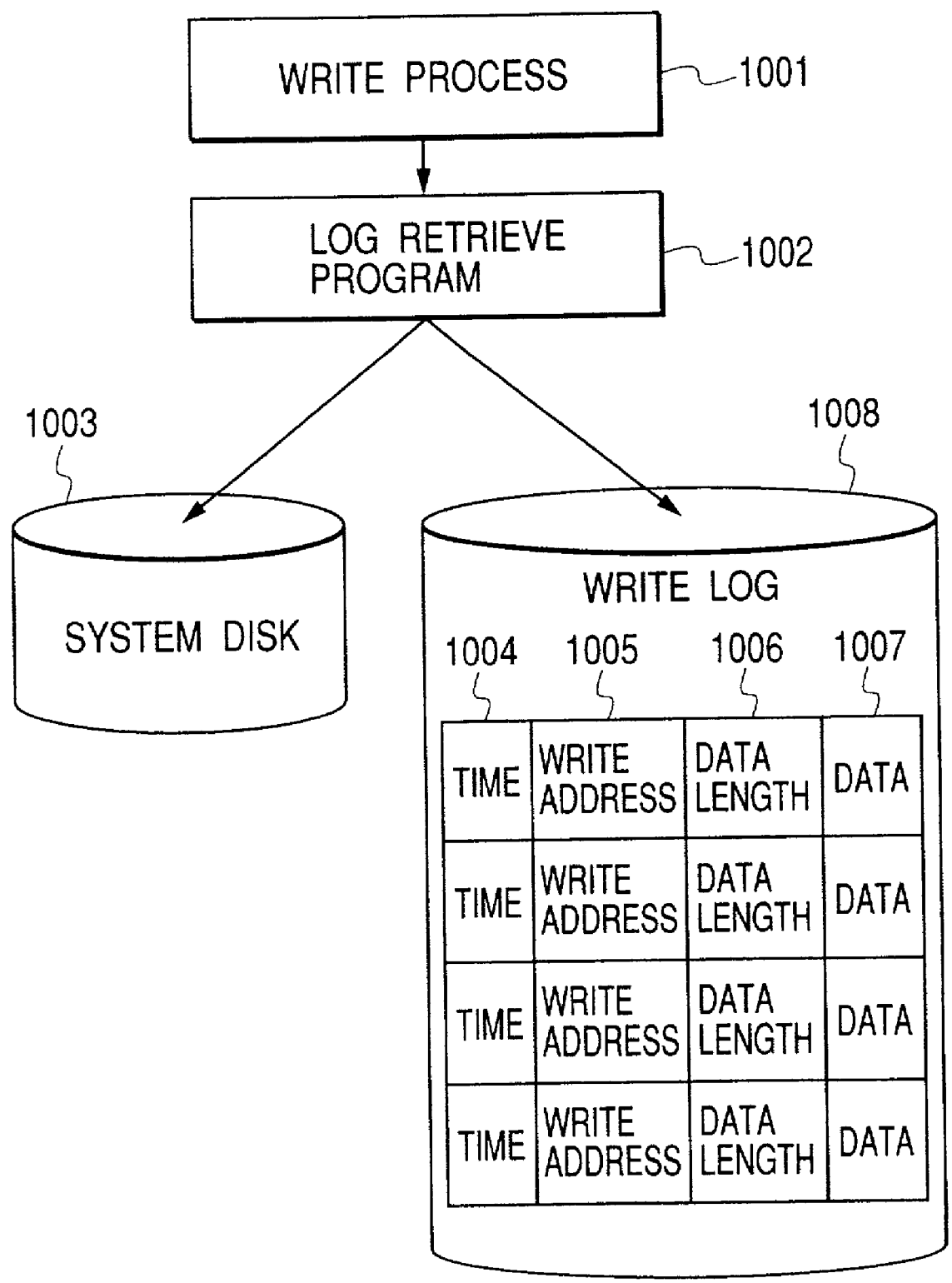
FIG. 10 is a diagram showing a configuration of a write log in the embodiment.

FIG. 10 is a diagram describing the collection of the write log in FIGS. 8 and 9. When the write operation is performed (1001), the log collection program 1002 traps the write operation so that the data is written on the system disk, for example, in case of the copying operation of the system disk, and a write time 1004, a write address 1005, data length

1006 and the data 1007 itself are appended to the write log disk 1008. Based upon such data, the system disk or the application disk may be updated to the latest state after the copying operation. By doing this, even when it takes long time to copy a disk having larger capacity, it is possible to reflect any change occurring during and/or after the copying operation to the disk that is a target of the copying operation. Therefore, Step 805 and Step 905 may be performed before regular running of the standby logical computer to reflect not-yet updated data on the disks. Alternatively, a feature of the disk device may be employed for such purpose. When the disk device has a disk mirroring feature as well as a feature to cancel the mirroring temporarily to be split into two independent disks, this feature may be used for copying the disk. A function similar to copying the disk may be provided by separating the mirroring at the request of Step 703 and Step 704, assigning the one disk to the logical computer that provide the current service, and assigning the other disk to the standby logical computer. If any update occurs in one of the two disks, this feature may synchronize data of both split disks when returning to the mirroring state again, thereby assuring an operation similar to copying the disk while keeping the latest information.

Figure 11:
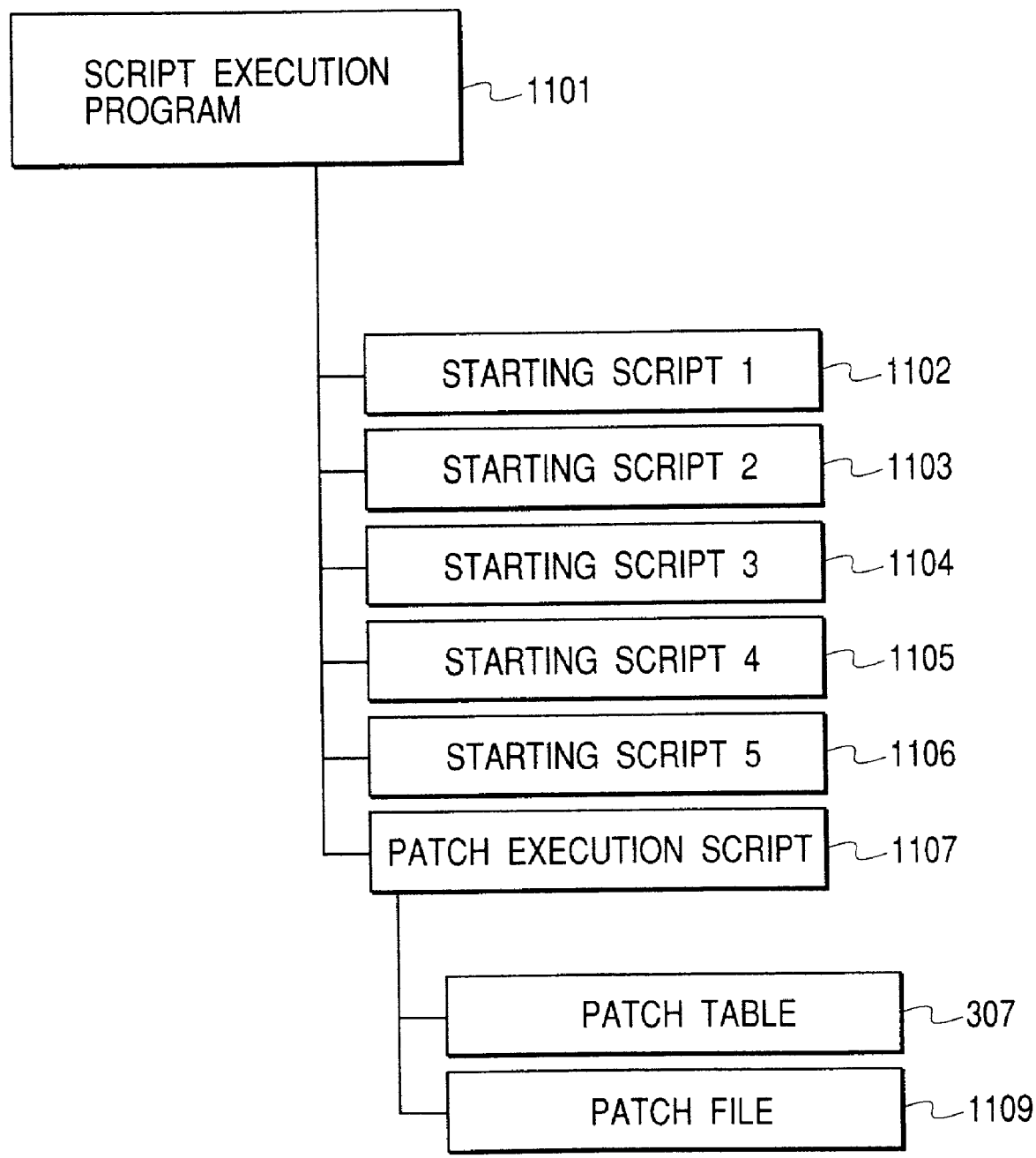
FIG. 11 is a diagram showing script structure in the embodiment.

FIG. 11 shows a series of programs associated with the patch execution script 1107 that is copied in Step 706 of FIG. 7. The operating system can store starting scripts 1102–1106 that are executed automatically upon start up. Using this feature, the patch execution script 1107 is intended to configure the patch process so that it is executed when the operating system starts up. When the operating system starts up, the script execution program 1101 automatically executes each of the starting scripts 1102–1106 in a sequential manner. The starting scripts 1102–1106 are stored in a specific location. The patch execution script 1107 is stored as one of such starting scripts. The patch execution script 1107 executes the patch process with reference to the patch file 1109 and the patch table 307. Though any starting program expressed in machine language may be used instead of such starting scripts, the scripts written in script language may be altered more easily by the system administrator. Examples of such scripts include a script consisting of system command strings.

Figure 12:
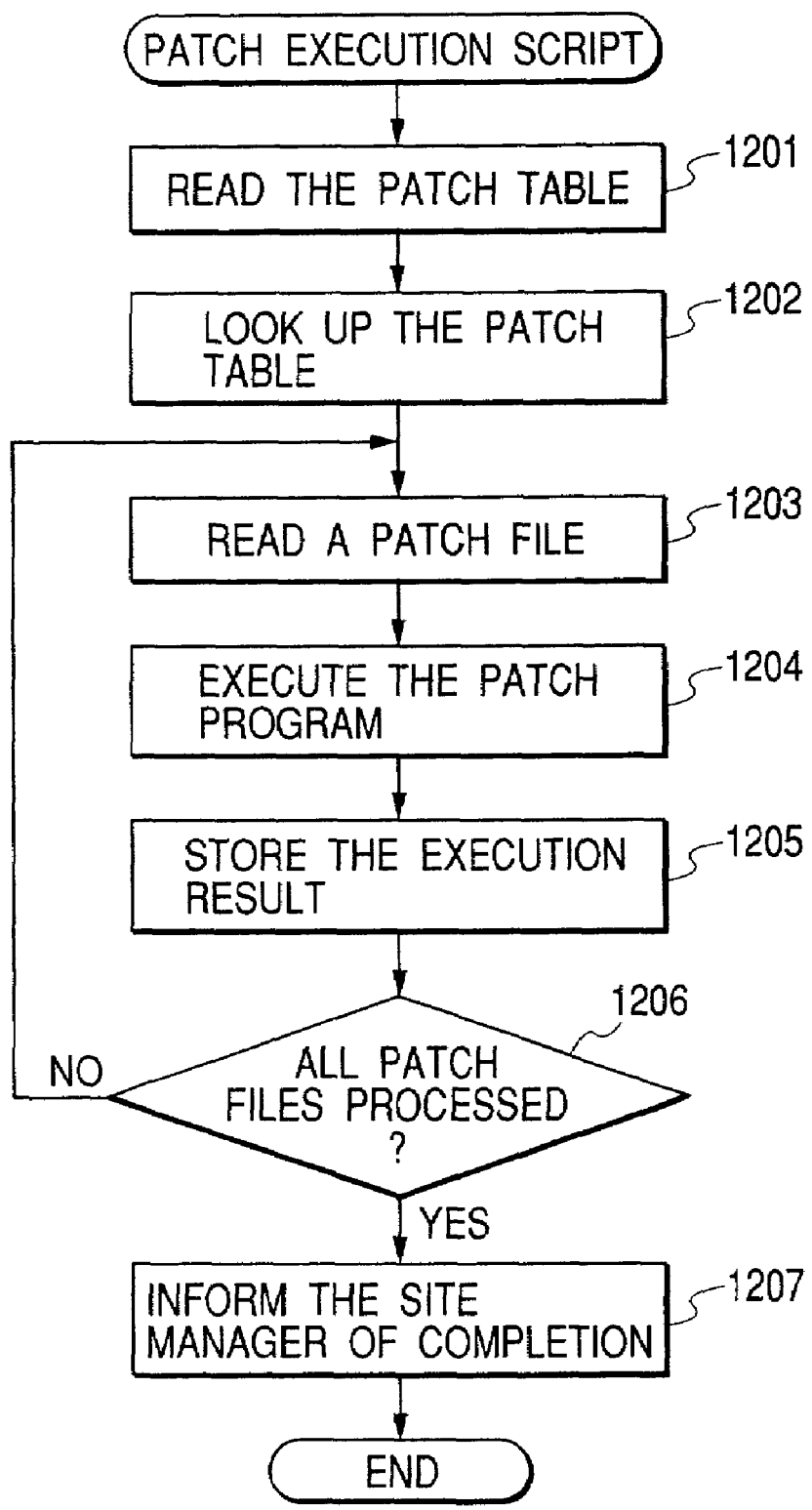
FIG. 12 is a flowchart of a patch execution script in the embodiment.

FIG. 12 shows a detailed process flow of the patch execution script 1107. In Step 1201, the patch table 307 is read in. In Step 1202, the patch table 307 is searched to determine the patch file 601 targeted for the particular patch process. The task is implemented by referring to the column 606 in FIG. 6 that specifies the patch file to be executed next time. In Step 1203, the specified patch file is read in, and in Step 1204, the patch program is executed. The patch program is typically included in the operating system as one of its standard components and, in cooperation with the specified patch file 1109, it can correct programs such as the operating system, the applications and so on. In Step 1205, a result of the patch program execution is stored in the column 607 of the patch table 307. In Step 1206, it is checked whether all specified patch files have been executed, then, if there remain unexecuted patch files, Step 1203 is performed again, or, if all have been executed, the process proceeds to Step 1207. In Step 1207, the patch manager 109 of the logical computer 1 is notified of completion of the patch process via the logical computer control program 305. When the patch manager 109 of the logical computer 1 is notified of the completion of the patch process, the patch manager 109 also receives data in the patch table 307 of the standby logical computer. By such notification, the patch manager 109 can be informed of the completion of the patch process as well as the result of the patch process from the patch table 307 that has information about whether the patch process has been normally performed.

Figure 13:
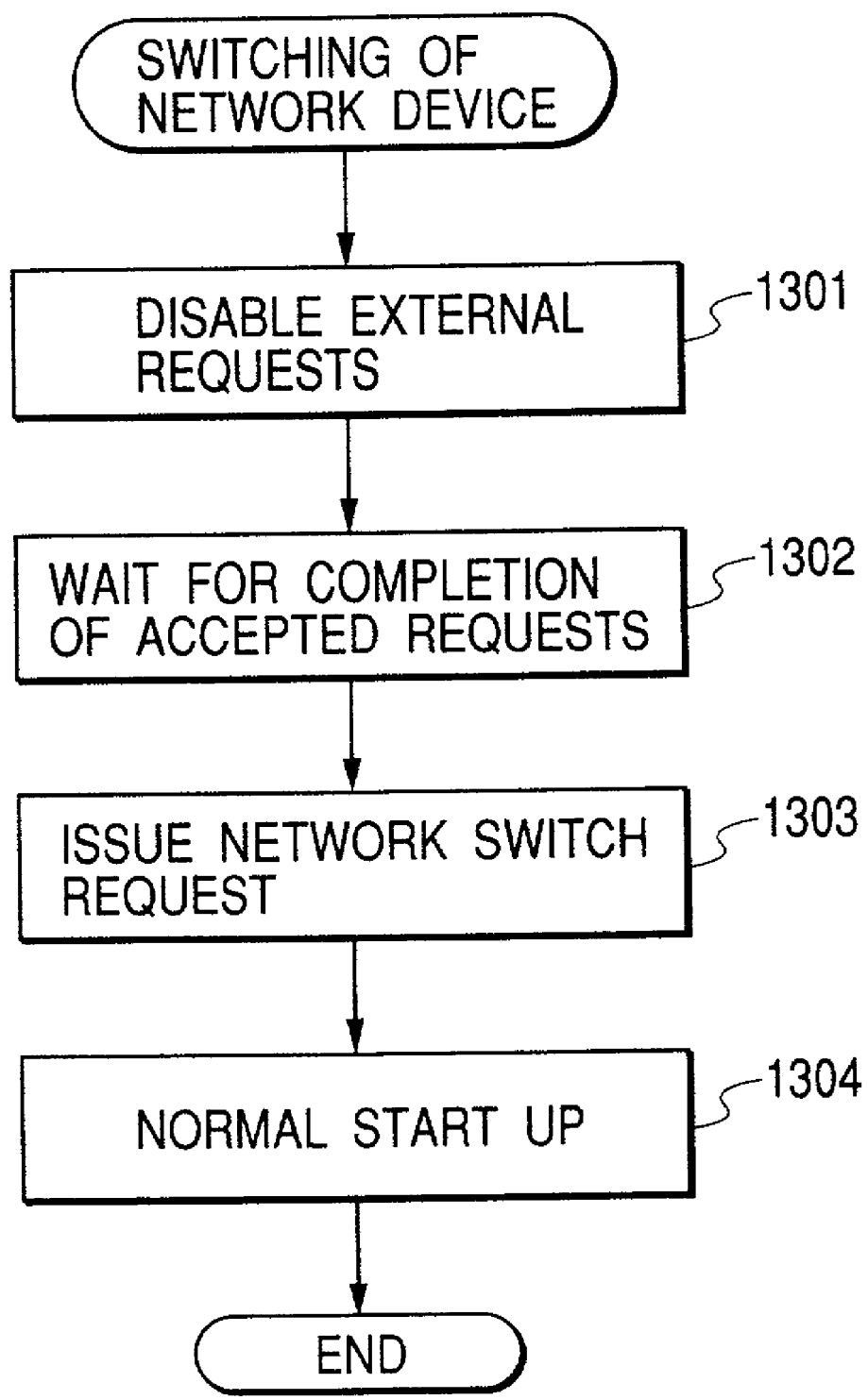
FIG. 13 is a flowchart of network switching in the embodiment.

FIG. 13 shows a flowchart of network switching. In Step 1301, acceptance of external requests for the network is prohibited until the network switching is completed. At this time, the requests that have been already accepted may be processed, but new requests cannot be accepted temporarily. In Step 1302, the system is in wait state until the already accepted requests are processed completely. In Step 1303, a request for the network switching is issued. The request for the network switching is issued via the logical computer control program 305 to the logical partitioning mechanism 110, which, in turn, in response to the request, switches the hardware path for the network from the current logical computer to the standby logical computer. In Step 1304, it is checked whether the network switching has been performed normally, and whether the service has been started normally after the activation of the application program 107 on the standby logical computer via the logical computer control program 305. If the switching of the network and/or the service has not been performed normally, interruption of the service may be prevented by switching the service again to the previous logical computer in reverse procedure. Though there may be a time period when the acceptance for the network is impossible for a while after Step 1301, it does not affect the user because the network will reissue the request automatically. Such network switching is illustrated in FIG. 14.

Figure 14:
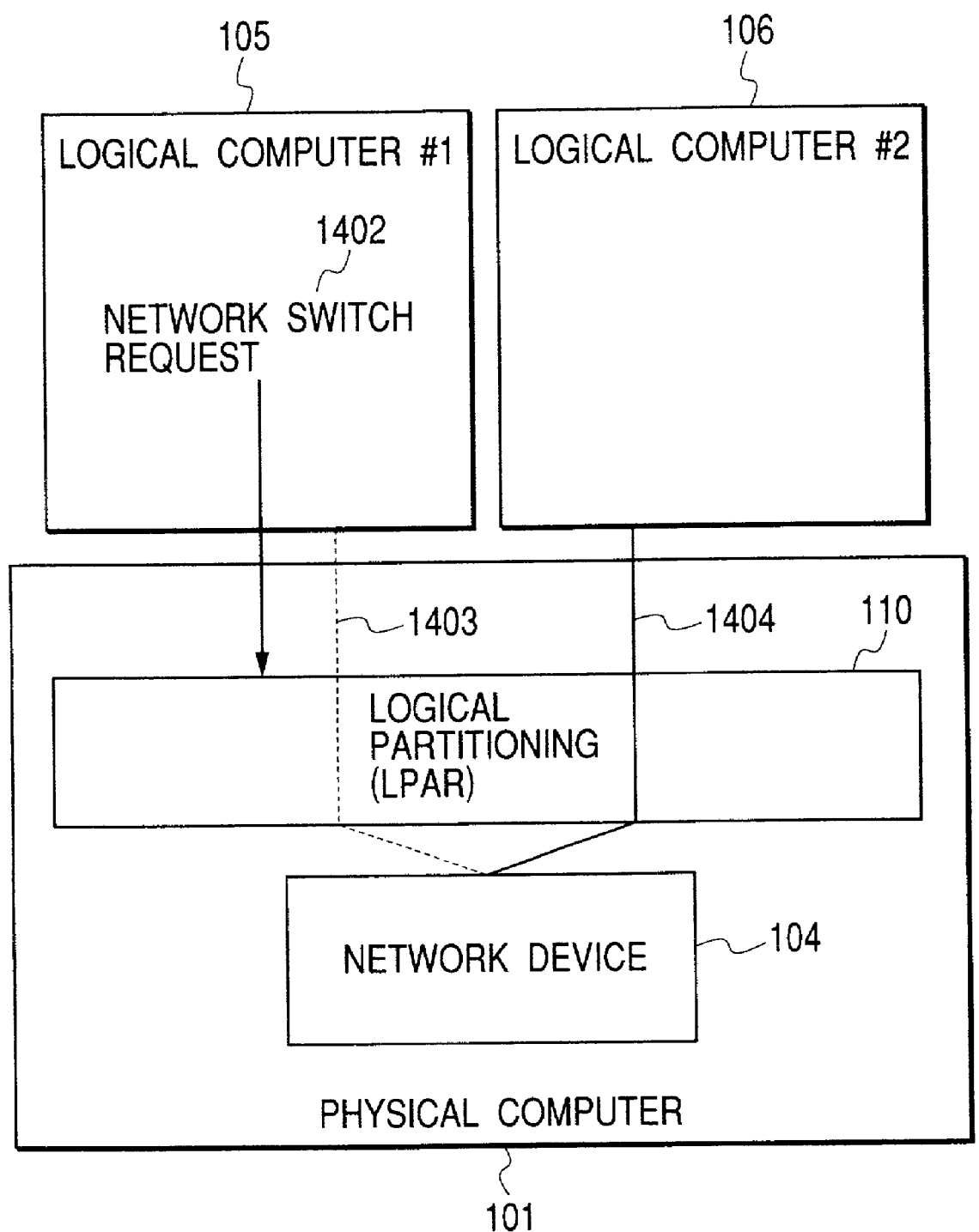
FIG. 14 is a diagram for describing network switching process in the embodiment.

FIG. 14 is a diagram describing the network switching. This example shows how the network device 104 is switched from the logical computer 1 (105) to the logical computer 2 (106). This feature is owned by the logical partitioning mechanism 110, wherein the communication path of the network device 104 is switched from the path 1403 of the previous logical computer to the path 1404 of the new logical computer in response to the network switching request 1402, whereby the data of the network device 104 can be accepted by the logical computer 2 (106). It allows the allocation of one of the network devices 104 in the physical computer 101 to be changed.

Figure 15:
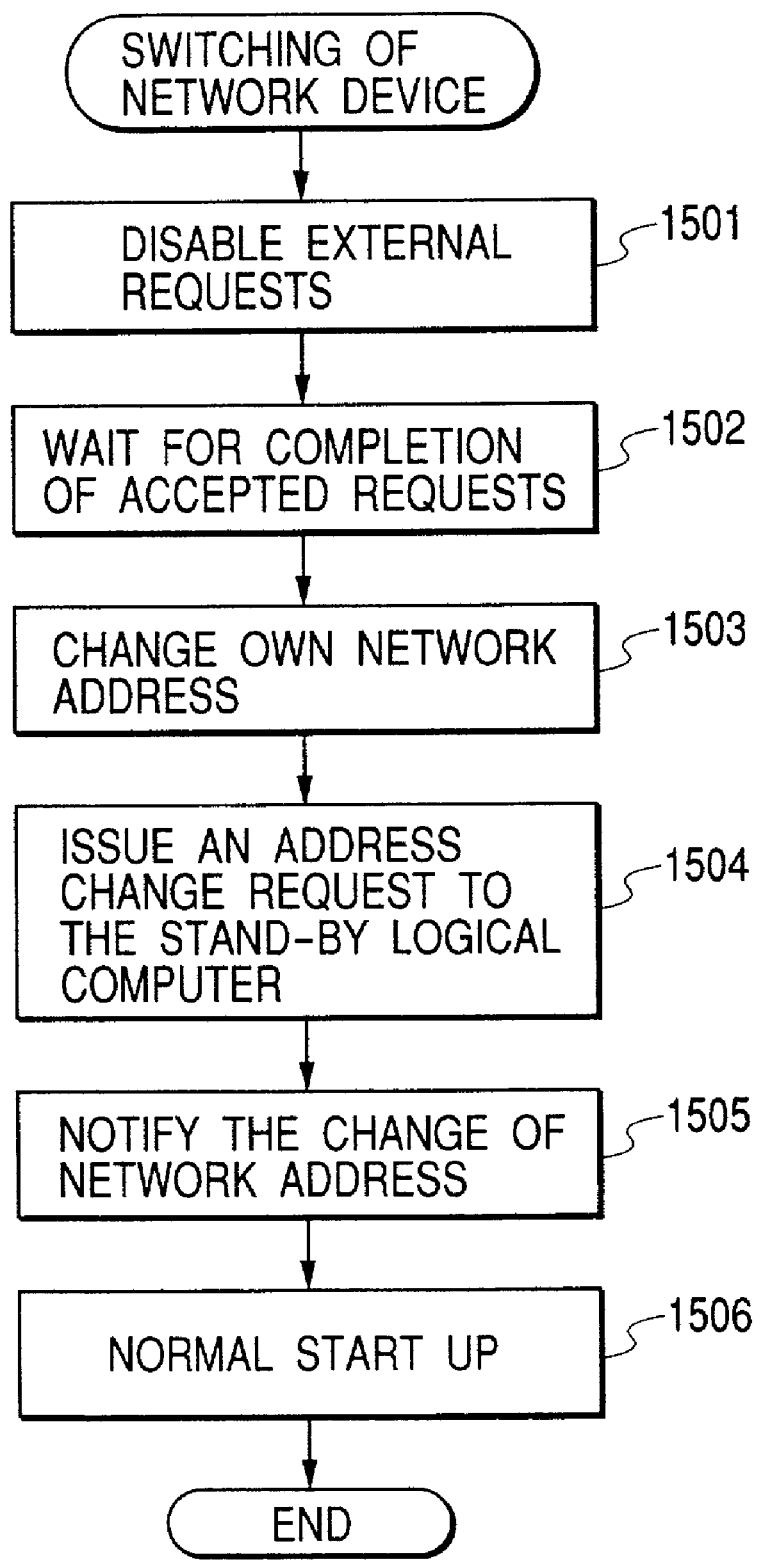
FIG. 15 is a flowchart of network switching in the embodiment.

FIG. 15 shows a process flow of network switching when the physical computer has more than one network device 104. It is to be noted that the network switching shown in FIG. 13 is a process flow to switch one network device 104, but FIG. 15 shows the process flow of the network switching when more than one network device 104 is used. In Step 1501, acceptance of external requests for the network is prohibited until the network switching is completed. Here, again, the requests that have been already accepted may be processed, but new requests cannot be accepted temporarily. In Step 1502, the system is in a wait state until the already accepted requests are processed completely. In Step 1503, the own network address is altered. This alternation is performed by the network information alternation program that is included in the operating system 108 as one of its standard components. In Step 1504, the request for the address change is issued to the standby logical computer via the logical computer control program 305. Here, the network address used by the logical computer that has processed the service until then is allocated to the standby logical computer. Such process is illustrated in FIG. 16.

Figure 16:
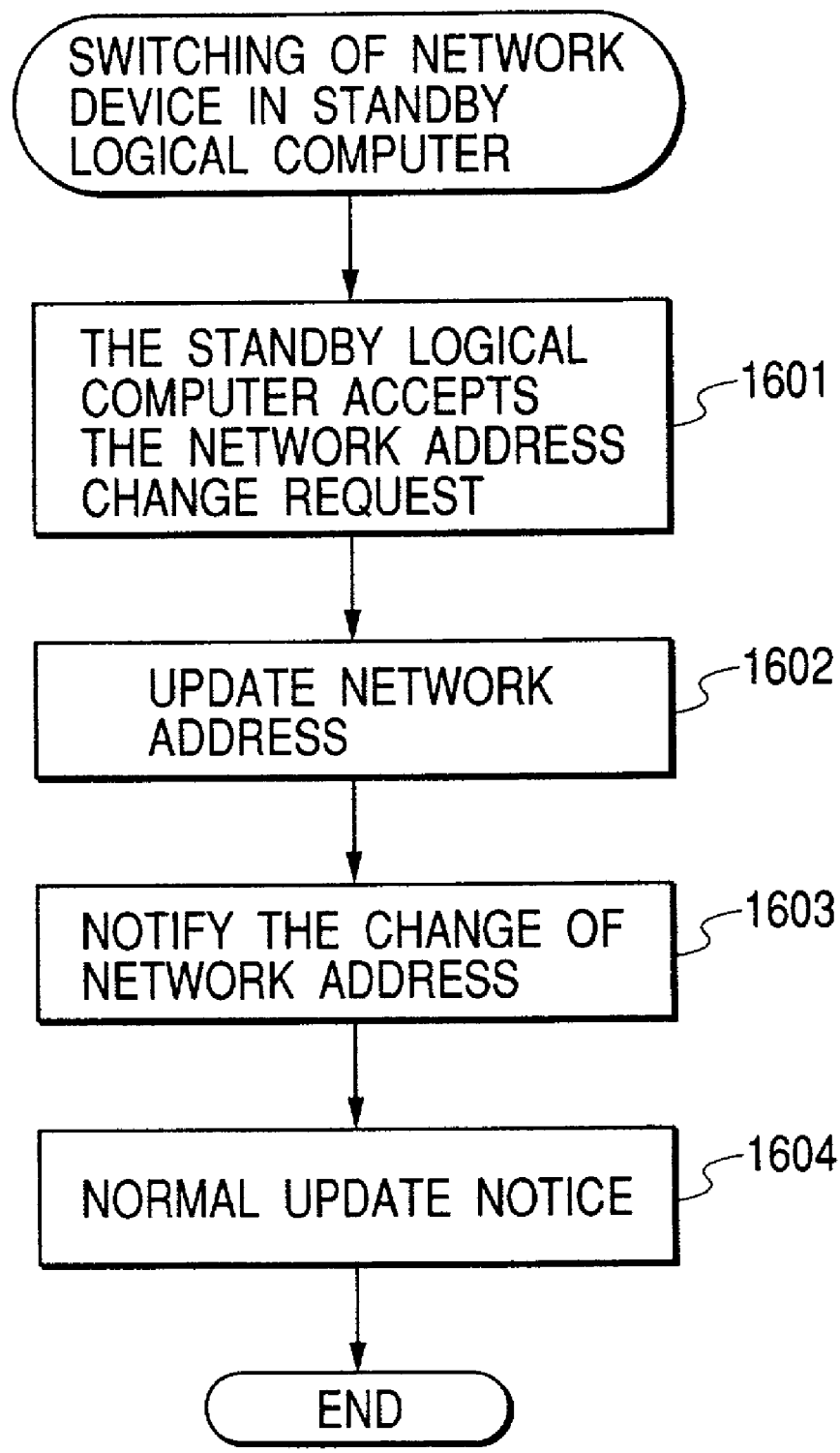
FIG. 16 is a flowchart of network switching in a standby logical computer in the embodiment.

In FIG. 16, the standby logical computer accepts the request for network address change in Step 1601. Then, in Step 1602, the network address is altered. The alternation is performed by the network information alternation program that is included in the operating system as one of its standard components. In Step 1603, devices on the network are notified of the alternation of the network address. In Step 1604, the requesting party is informed whether the switching has been performed normally via the logical computer control program 305. Through the above procedure, the network address of the standby logical computer is altered. On the other hand, in Step 1505 of FIG. 15, the devices on the network are notified of the alternation of the network address. In Step 1506, it is checked whether the network switching has been performed and the service has been started normally. If the network switching and/or the service have not been performed normally, interruption of the service may be prevented by switching the service again to the previous logical computer in reverse procedure. Through such process, the logical computer that has provided the service previously obtains new address, and the standby logical computer can inherit the network address of the logical computer that has provided the service previously.

Figure 17:
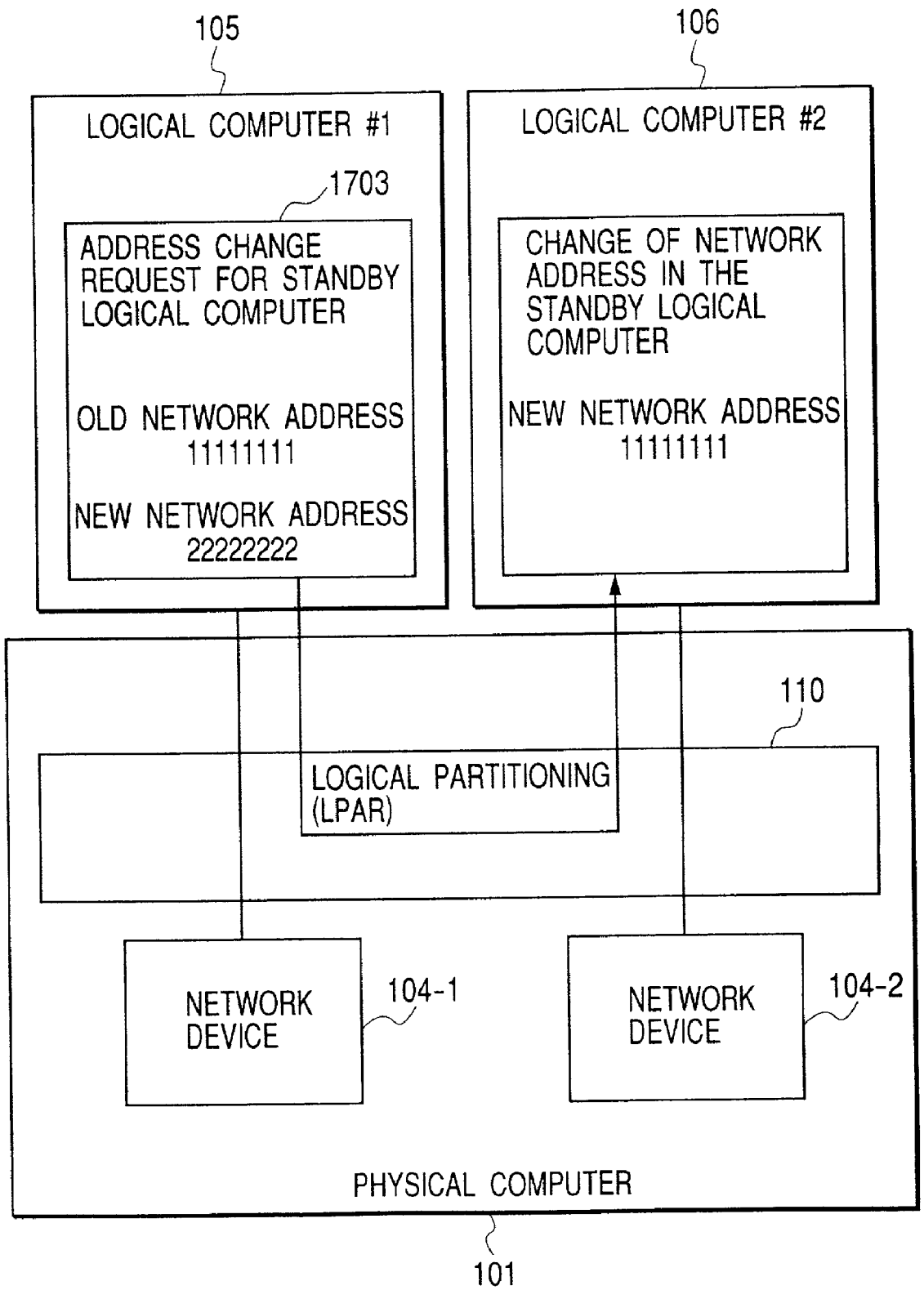
FIG. 17 is a diagram for describing network switching process in the embodiment.

FIG. 17 shows the network switching when the physical computer 101 has two network devices (104-1, 104-2). In this example, switching of the network address from the logical computer 1 (105) to the logical computer 2 (106) is shown. The network device 104-1 is assigned to the logical computer 1 (105) and the network device 104-2 is assigned to the logical computer 2. Through the process of FIG. 15, for example, the previous network address of the logical computer 1 (11111111) is altered into new network address (22222222) and the network address of the logical computer 2 is altered into (11111111). The logical computer 1 (105) issues the request for the network address change via the logical partitioning mechanism 110 to the logical computer 2 (106) (1703), thereby enabling communication between logical computers without the network devices. Through such process, the service can be transferred to the new logical computer, maintaining the network connection of the two logical computers.

Figure 18:
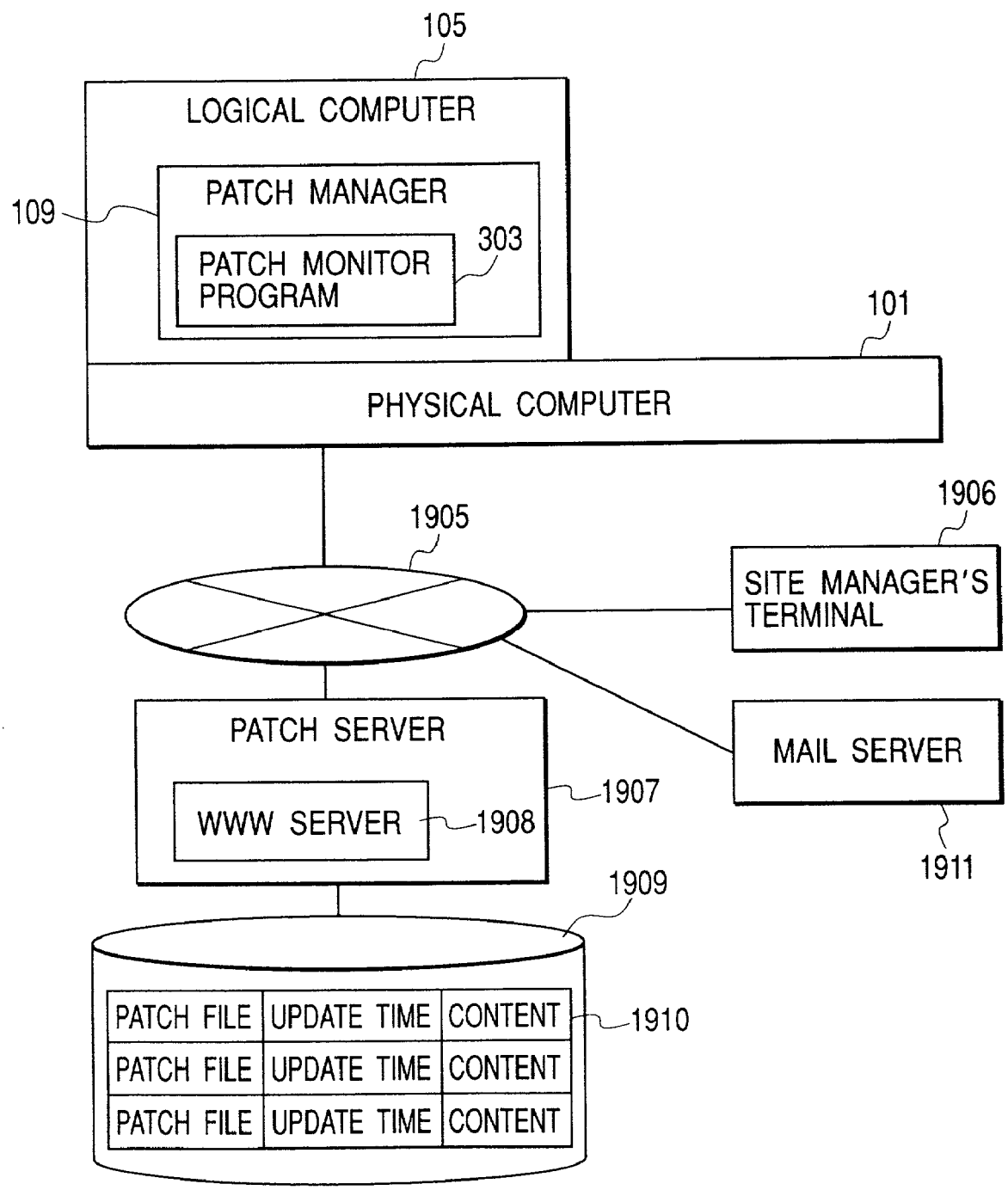
FIG. 18 is a diagram showing operating environment for a patch monitoring program in the embodiment.

FIG. 18 shows general description of the patch monitor program 303 in the patch manager that is running on the logical computer 105 on the physical computer 101. The patch monitor program 303 functions to check updating status of the patch server 1907 on the Internet 1905 in which patch files are stored, notify the administrator terminal 1906 of update of the patch files via the mail server 1911, and instruct the patch monitor program 303 whether to execute the patch process of which the administrator terminal 1906 has been notified. The patch server 1907 is composed of a WWW server 1908 or a file transfer server and stores files 1910 describing file names, update time and contents of the patch files in its disk. Hereinafter, the patch monitor program 303 will be described in detail.

Figure 19:
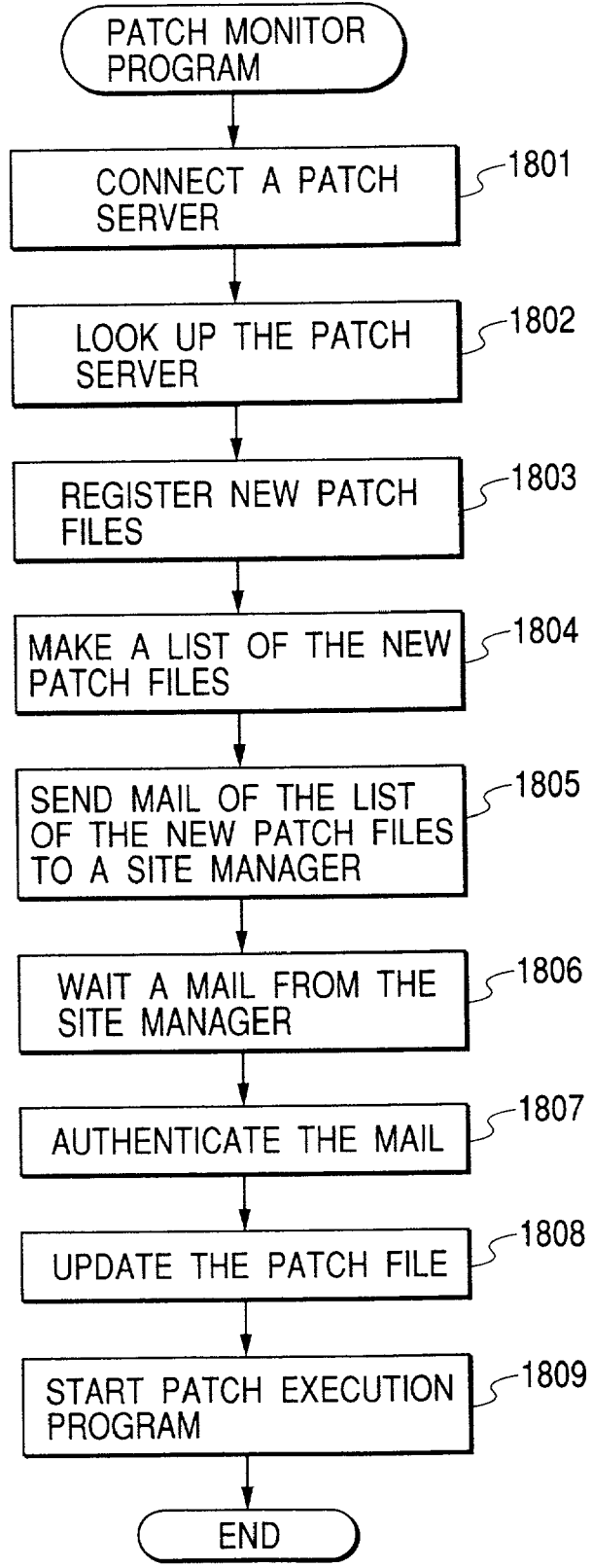
FIG. 19 is a process flowchart of the patch monitoring program in the embodiment.
Figure 20:
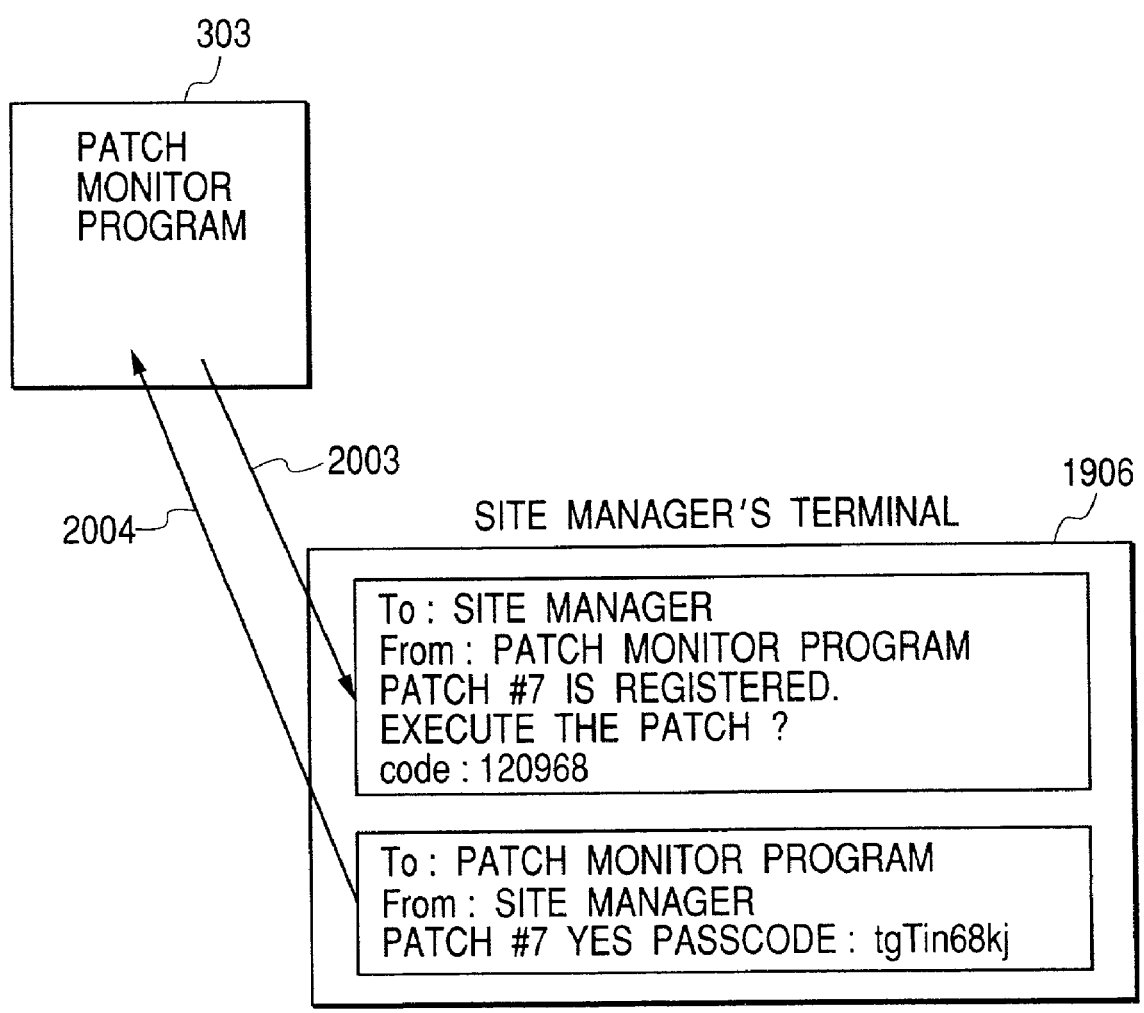
FIG. 20 is a diagram showing an operation overview of the patch monitoring program in the embodiment.

FIG. 19 shows a process flow of the patch monitor program 303. In Step 1801, the patch monitor program 303 is connected to the patch server 1907 on the Internet 1905 and the like. In Step 1802, the patch server is searched, and any patch file that has been updated after the previous monitoring, if found, is downloaded and registered on the patch table 307 (Step 1803). In Step 1804, a list of newly registered patch files is created, and in Step 1805, the administrator terminal 1906 is notified of the list by means of e-mail. Here, alternatively, only important items about security in the list may be transmitted to the administrator terminal by referencing types of the patch files (from security 602 to functional correction 604 in FIG. 6). In Step 1806, the patch monitor program 303 is waiting for instructions from the administrator terminal 1906 via e-mail. In Step 1807, authentication of the e-mail from the administrator terminal 1906 is performed and, if the e-mail is authenticated, the process proceeds to Step 1808 where the column 606 in the patch table 307 defining whether the patch file should be next executed is updated according to the instructions. Then, the patch execution program 302 is activated to perform the patch process in Step 1809. The patch monitor program 303 activates periodically to monitor whether new patch files are registered. FIG. 20 shows general description of communication between the administrator terminal 1906 and the patch monitor program 303.

FIG. 20 shows an example of e-mail communication between the patch monitor program 303 and the administrator terminal 1906. When a new patch file is registered, the patch monitor program 303 transmits e-mail to the administrator terminal 1906 (Step 2003). At this time, a code for authentication is transferred. Upon receipt of the e-mail, the administrator terminal 1906 sends back e-mail defining whether the patch process should be executed along with a code generated from the authentication code to the patch monitor program 303 (Step 2004). Here, it is checked whether the e-mail is from the proper administrator by generating the code by means of the patch monitor program 303 in a same manner as the administrator terminal 1906 and comparing the code with the code transmitted by the administrator terminal 1906, wherein if the two codes are same, the administrator is authenticated. Each of these e-mail messages is transferred via the mail server 1911. As described above, the administrator is able to make proper decisions about even frequently updated patch information and to give instructions via e-mail, and therefore to perform patch process immediately from a remote location.

As an effect of the first embodiment, even the physical computer 101 that has only one processor physically can perform patch process without discontinuing service by using the logical partitioning mechanism 110.

Further, in the first embodiment, though the logical partitioning mechanism 110 that is implemented by hardware is employed, the present invention may be applied to the case where the computer resource is partitioned by software to build a plurality of virtual computers. But, the logical partitioning mechanism 110 implemented by the hardware as described in the first embodiment shows better utilization ratio of the computer resource.

[Embodiment 2]

Figure 21:
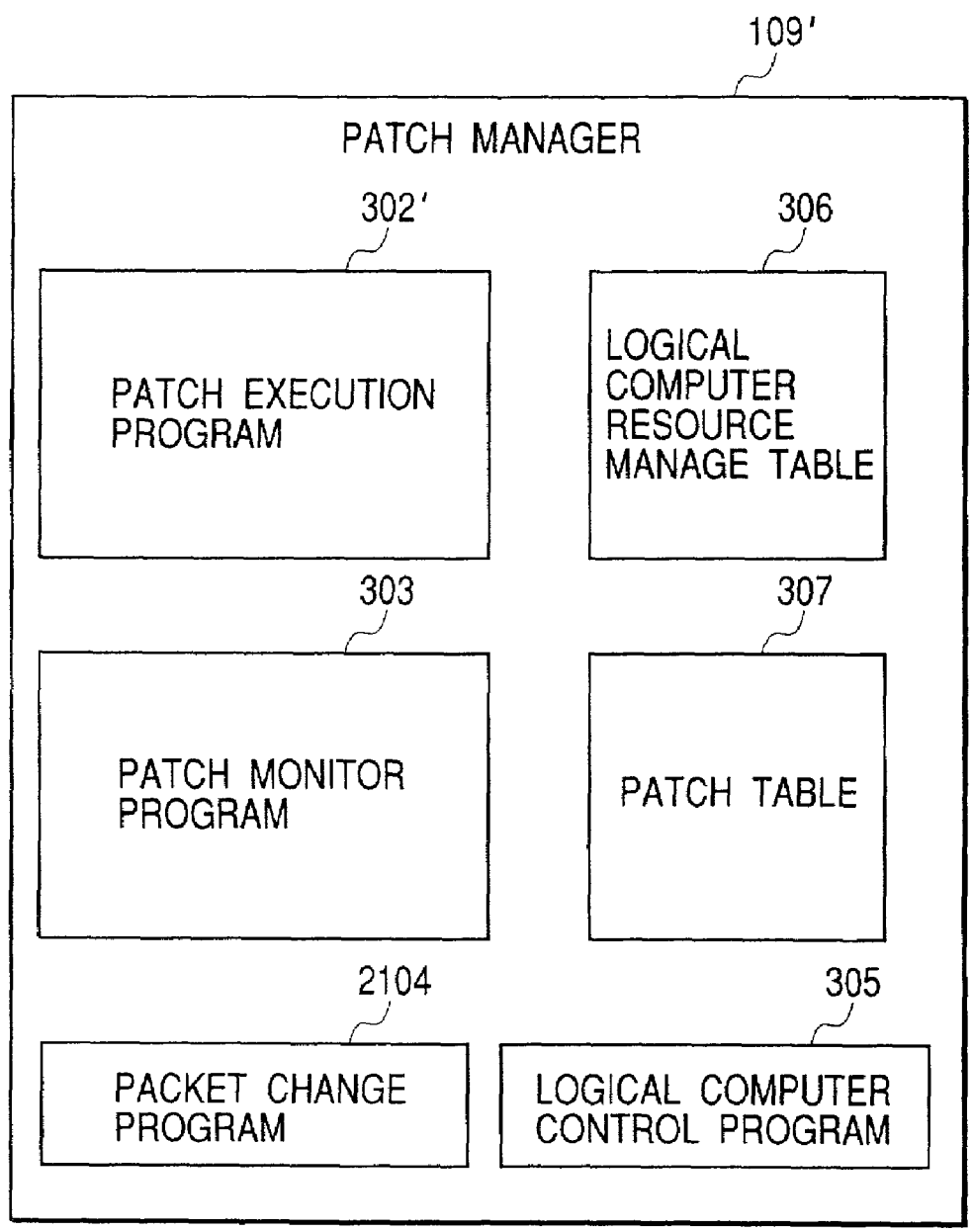
FIG. 21 is a diagram showing a configuration of a patch manager in a second embodiment.

In a second embodiment, a method for network switching without temporal discontinuance of service is shown. In the first embodiment, there are time periods when the service cannot be provided temporarily in Steps 1301–1304 of FIG. 13 and in Steps 1501–1506 of FIG. 15. In contrast, the second embodiment is intended to allow all requests to be acceptable. FIG. 21 shows a configuration of a patch manager 109'. The patch manager 109' consists of a patch execution program 302', a patch monitor program 303, a logical computer resource management table 306, a patch table 307, a logical computer control program 305 and the packet change program 2104. The patch execution program 302' is a program for controlling the program correction process by using the standby logical computer. The patch monitor program 303 is a program for periodically monitoring a patch server 1907 on the Internet 1905 and the like which stores patch files to see whether new patch files are registered, and prompting an administrator to execute the patch process. Resources owned by each logical computer such as processors, disk devices, network devices and the like are registered in the logical computer resource management table 306. The patch table 307 is a table for managing the patch files, where information such as distinction between already processed patch files and still not processed ones is registered. The logical computer resource management table 306 and the patch table 307 are referred/updated upon execution of the patch execution program 302' and the patch monitor program 303. The logical computer control program 305 is used when the patch execution program 302' and the patch monitor program 303 control the logical computers. The logical computer control program 305 provides an interface for communication between the logical computers, activation of the logical computers and so on. The packet change program 2104 has a function to update information to be transmitted to the network and will be described in detail later. Each component other than described hereinafter is same as in the first embodiment.

Figure 22:
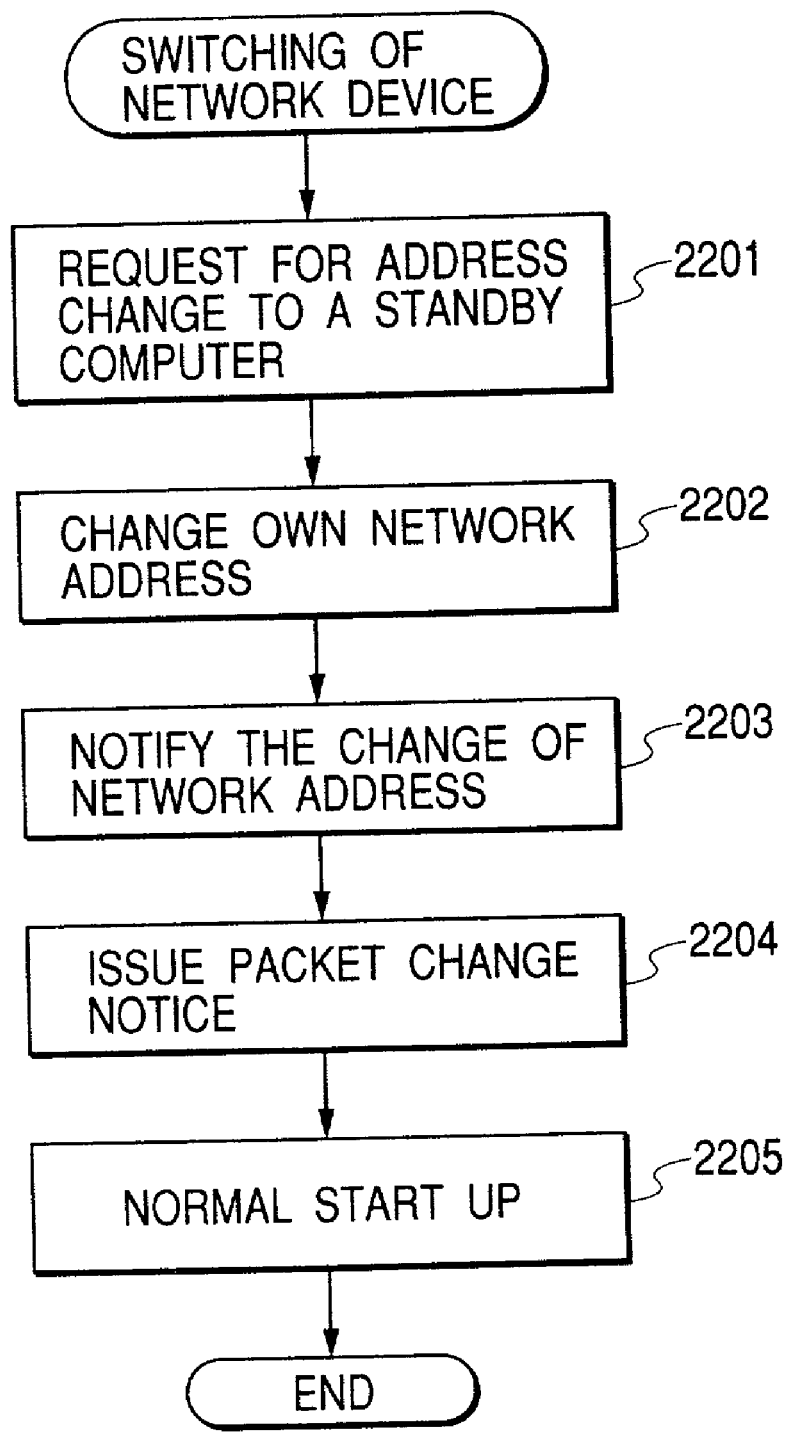
FIG. 22 is a flowchart of network switching in the second embodiment.

FIG. 22 shows a process flow of network switching in the patch execution program 302'. In Step 2201, a request for address change is issued to the standby logical computer. In Step 2202, the own network address is altered. In Step 2203, devices on the network are notified of the change of the network address. At this point, the logical computer that has provided the service till then has a new network address and the standby logical computer inherits the previous network address of the logical computer that has provided the service previously. Newly issued requests from the network are processed on the new standby logical computer. But, in the previous logical computer the requests that have been not processed may still remain, which must be processed normally. For such purpose, the patch execution program 302' issues patch change notice in Step 2204. It will be described in detail later. In Step 2205, it is checked whether the network switching has been performed normally and the service has been started normally. If the network switching and/or the service have not been performed normally, interruption of the service may be prevented by switching the service again to the previous logical computer in reverse procedure. Through such process, the logical computer that has provided the service previously obtains the new address, and the standby logical computer can inherit the network address of the logical computer that has provided the service previously.

Figure 23:
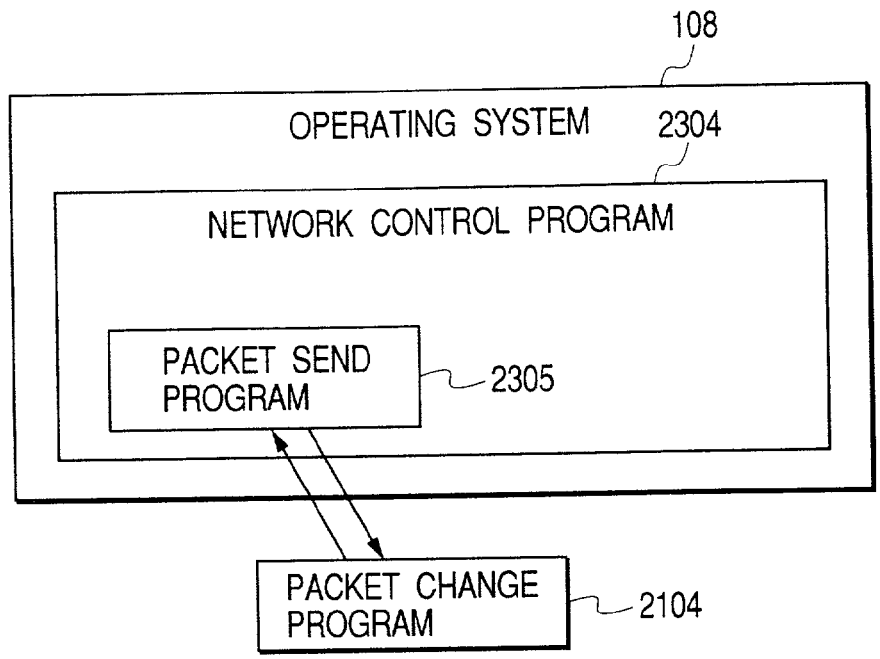
FIG. 23 is a location of a packet modification program in the second embodiment.

FIG. 23 shows a position of the packet change program 2104. The packet send program 2305 is located under the network control program 2304 in the operating system 108 and performs packet transmission process. The packet change program 2104 is a program that is invoked by the packet send program 2305.

Figure 24:
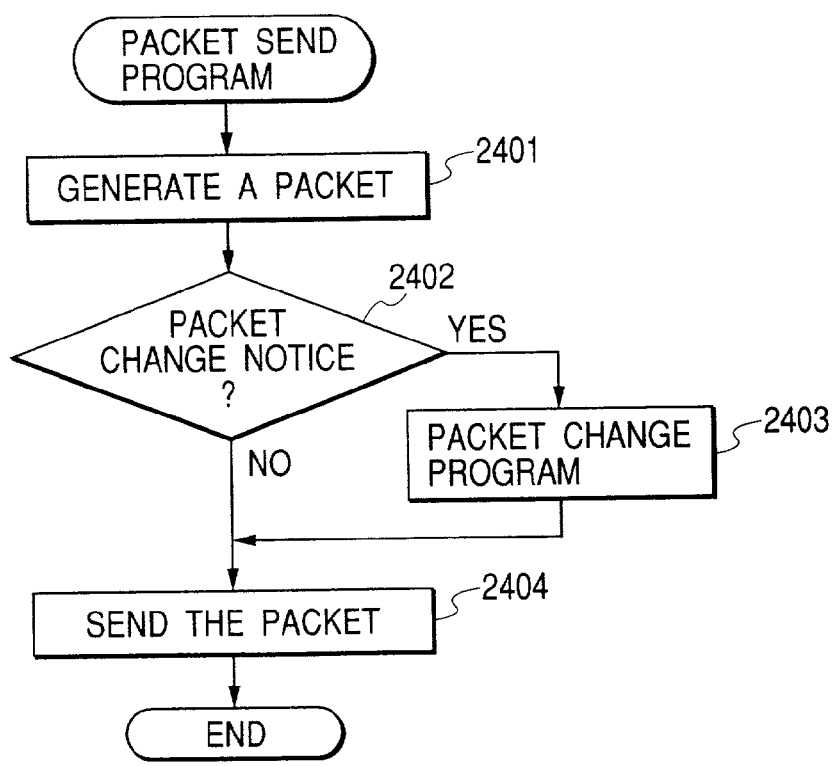
FIG. 24 is a flowchart of a packet transmission program in the second embodiment.
Figure 25:
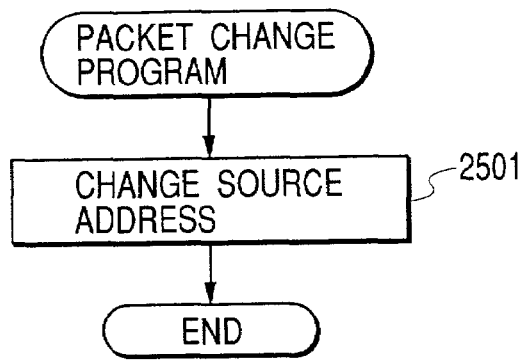
FIG. 25 is a flowchart of the packet alternation program in the second embodiment.

FIG. 24 shows a process flow of the packet send program 2305. In Step 2401, the packet send program 2305 generates a packet from the requested data. In Step 2402, it is checked whether the packet change notice has been issued. It is the packet change notice that is issued in Step 2204 of FIG. 22. If the packet change notice has been issued, the process proceeds to Step 2403 to invoke the packet change program 2104. As shown in FIG. 25, the packet change program 2104 alters the source network address back to the previous network address that was used when the service was processed (Step 2501). The generated packet is transmitted in Step 2404.

Figure 26A:
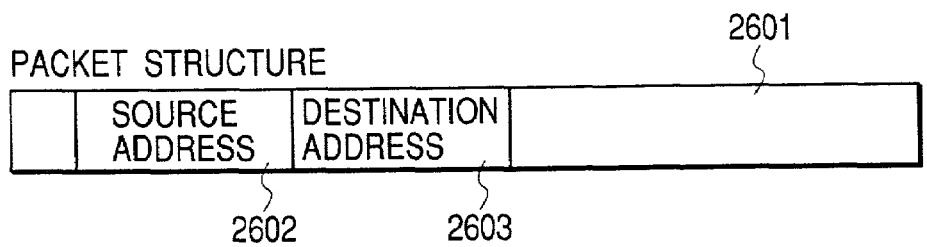
FIGS. 26A, 26B, and 26C are diagrams showing a structure of a packet in the second embodiment.
Figure 26B:
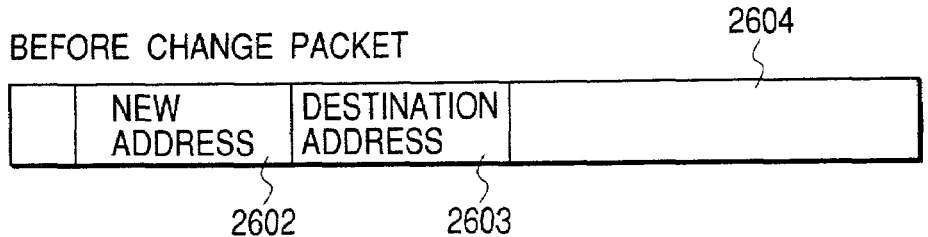
Figure 26C:
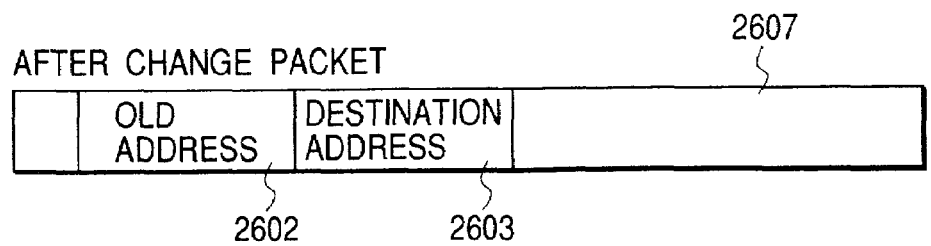

The packet is a data that is transferred via the network and, as shown in FIG. 26A, stores the source network address 2602 and the destination network address 2603 therein. The packet structure before executing the packet change program 2104 is shown in FIG. 26B where the new network address updated by Step 2202 of FIG. 22 is stored in the source network address field 2602. Since the request from the device on the network that caused such packet was accepted when the service was provided in the name of the previous network address, if the packet is sent back to the device without alternation, the device cannot accept this packet. Therefore, only while the packet change notice is issued, the packet change program 2104 alters the source network address stored in the packet to the previous network address that was used when the service was processed as shown in FIG. 26C. It eliminates the problem that may otherwise occur when the logical computer is switched halfway in the process. It is to be noted that it is desirable that the packet change notice is canceled when all the requests have been processed.

An effect of the second embodiment is to allow the patch process to be performed without discontinuing the service absolutely.

Further, in the second embodiment, though the logical partitioning mechanism 110 that is implemented by hardware is employed, the present invention may be applied to the case where the computer resource is partitioned by software to build a plurality of virtual computers. But, the logical partitioning mechanism 110 implemented by the hardware as described in the second embodiment shows better utilization ratio of the computer resource.

According to the present invention, the patch process can be processed without discontinuing the service, and the administrator can be aware of the update of the patch files readily even when the patch files are updated frequently, and further can provide instructions for the patch update from a remote location.

What is claimed is:

1. A method for correcting programs in a computer system connected to a network and having a plurality of logical computers said method comprising the steps of:
    copying a system disk storing an operating system that is in operation on a first logical computer for processing a service and an application disk storing application programs and data under control of said first logical computer from a first storage means assigned to said first logical computer to a second storage means;
    starting up the operating system in a second logical computer that has been in standby mode by using said copied system disk;
    correcting programs stored in said copied system disk and said copied application disk by applying patch files; and
    switching processing of said service from said first logical computer to said second logical computer that uses said corrected programs by switching a communication path leading external requests for said service via the network from a first path connected to said first logical computer to a second path connected to said second logical computer,
    wherein, the first logical computer continues to process said service until said switching step is executed.

2. A method for correcting programs according to claim 1, further comprising the steps of: collecting a log of update applied to said first storage means from which the programs and the data are copied during and after said copying step; and applying said log of update on said second storage means to which the programs and the data are copied before said switching step to reflect any update applied to said first storage means.

3. A method for correcting programs according to claim 1, further comprising the steps of: sending a correction result of said copied programs from said second logical computer to said first logical computer; and if it is determined that the correction of said programs has been finished normally, then performing said step of switching.

4. A method for correcting programs according to claim 1, wherein said step of switching includes the steps of: prohibiting acceptance of said external requests for said service via said network; completing process of the external requests via said network; completing process of the external requests that have been accepted previously; altering a first network address of a first network device under control of said first logical computer to a second network address; and setting said first network address as a network address of a second network device under control of said second logical computer.

5. A method for correcting programs according to claim 1, further comprising the steps of: when the first network device under control of said first logical computer that is in operation has the first network address as its network address, in said step of switching, setting said first network address as the network address of the second network device under control of said second logical computer; altering the network address of said first network device to the second network address; and in a packet that is transmitted externally via said network and that has said second network address as its source address, altering said source address to said first network address.

6. A computer readable medium having program code recorded thereon executed by a computer system connected to a network and having a plurality of logical computers, the program code causing the computer system to perform the steps of:

copying a system disk storing an operating system that is in operation on a first logical computer for processing a service and an application disk storing application programs and data under control of said first logical computer from a first storage means assigned to said first logical computer to a second storage means;

starting up the operating system in a second logical computer that has been in standby mode by using said copied system disk;

correcting programs stored in said copied system disk and said copied application disk by applying patch files, and switching processing of said service from said first logical computer to said second logical computer that uses said corrected programs by switching a communication path leading external requests for said service via the network from a first path connected to said first logical computer to a second oath connected to said second logical computer;

wherein, the first logical computer continues to process said service until said switching step is executed.

7. A computer readable medium having program code recorded thereon executed by a computer system according to claim 6, the program code further causing the computer system to perform the steps of: collecting a log of update applied to said first storage means from which the programs and the data are copied during and after said copying step; and applying said log of update on said second storage means to which the programs and the data are copied before said switching step to reflect any update applied to said first storage means.

8. A computer readable medium having program code recorded thereon executed by a computer system according to claim 6, the program code further causing the computer system to perform the steps of: sending a correction result of said copied programs from said second logical computer to said first logical computer; and if it is determined that the correction of said programs has been finished normally, then performing said step of switching.

9. A computer readable medium having program code recorded thereon executed by a computer system according to claim 6, wherein said switching step includes the steps of: prohibiting acceptance of said external requests for said service via said network; completing process of the external requests that have been accepted previously; altering a first network address of a first network device under control of said first logical computer to a second network address; and setting said first network address as a network address of a second network device under control of said second logical computer.

10. A computer readable medium having program code recorded thereon executed by a computer system according to claim 6, the program code further causing the computer system to perform the steps of: if the first network device under control of said first logical computer that is in operation has the first network address as its network address, in said step of switching said network, setting said first network address as the network address of the second network device under control of said second logical computer; altering the network address of said first network device to the second network address; and in a packet that is transmitted externally via said network and that has said second network address as its source address, altering said source address to said first network address.

11. A method for correcting programs according to claim 1, wherein said patch files are copied on said system disk before said starting up step.

* * * * *